(12) United States Patent
Guan et al.

(10) Patent No.: US 11,388,715 B2
(45) Date of Patent: Jul. 12, 2022

(54) INFORMATION TRANSMISSION METHOD AND APPARATUS

(71) Applicant: Huawei Technologies Co., Ltd., Shenzhen (CN)

(72) Inventors: Lei Guan, Beijing (CN); Dan Hu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 181 days.

(21) Appl. No.: 16/985,985

(22) Filed: Aug. 5, 2020

(65) Prior Publication Data

US 2020/0367238 A1 Nov. 19, 2020

Related U.S. Application Data

(63) Continuation of application No. PCT/CN2019/074500, filed on Feb. 1, 2019.

(30) Foreign Application Priority Data

Feb. 13, 2018 (CN) .......................... 201810150954.9
Apr. 4, 2018 (CN) .......................... 201810301984.5

(51) Int. Cl.
*H04W 72/04* (2009.01)
*H04L 5/00* (2006.01)

(52) U.S. Cl.
CPC ..... *H04W 72/0446* (2013.01); *H04W 72/042* (2013.01); *H04W 72/0493* (2013.01)

(58) Field of Classification Search
CPC ........... H04W 72/0446; H04W 72/042; H04W 72/0493
See application file for complete search history.

(56) References Cited

U.S. PATENT DOCUMENTS

2017/0353342 A1 12/2017 Baskaran et al.
2018/0083758 A1* 3/2018 Islam ................ H04W 72/0406

FOREIGN PATENT DOCUMENTS

CA 3074331 A1 * 3/2019 .......... H04W 72/042
CN 107241288 A 10/2017
(Continued)

OTHER PUBLICATIONS

Ali A. Esswie et al., 'Null Space Based Preemptive Scheduling For Joint URLLC and eMBB Traffic in 5G Networks', 2018 IEEE, pp. 1-6. (Year: 2018).*

(Continued)

*Primary Examiner* — Melvin C Marcelo
(74) *Attorney, Agent, or Firm* — Slater Matsil, LLP

(57) ABSTRACT

This application provides an information transmission method and an apparatus. The method includes: determining, by a terminal device, a target time domain interval, where a time domain resource in the target time domain interval includes at least one candidate time domain resource used to carry first resource indication information, the first resource indication information is used to indicate a first time domain resource, the first time domain resource at least partially overlaps a second time domain resource, and the second time domain resource is used to carry a first uplink signal; receiving, by the terminal device, the first resource indication information on a first candidate time domain resource in the target time domain interval; and prohibiting, by the terminal device based on the first resource indication information, sending of at least a part of the first uplink signal.

20 Claims, 5 Drawing Sheets

(56) References Cited

FOREIGN PATENT DOCUMENTS

| CN | 107404370 A | 11/2017 | | |
|---|---|---|---|---|
| EP | 3742847 A1 | * | 11/2020 | ........... H04L 5/0057 |
| WO | 2017179915 A2 | 10/2017 | | |
| WO | 2018012899 A1 | 1/2018 | | |
| WO | 2018021834 A1 | 2/2018 | | |

OTHER PUBLICATIONS

Chih-Ping Li et al., '5G Ultra-Reliable and Low-Latency Systems Design', 2017 IEEE, pp. 1-5. (Year: 2017).*

"3rd Generation Partnership Project; Technical Specification Group Radio Access Network; NR; Multiplexing and channel coding (Release 15)", 3GPP TS 38.212 V15.1.0, Mar. 2018, total 94 pages.

"3rd Generation Partnership Project; Technical Specification Group Radio Access Network; NR; Physical layer procedures for control (Release 15)", 3GPP TS 38.213 V15.0.0, Dec. 2017, total 56 pages.

LG Electronics, "Discussion on multiplexing UL transmission with different requirements", 3GPP TSG RAN WG1 Meeting #92, R1-1802228, Athens, Greece, Feb. 26-Mar. 2, 2018, total 6 pages.

Apple Inc., "Slot Format Indicator in Group-common PDCCH", 3GPP TSG-RAN WG1 NR#3, R1-1717782, Oct. 9-13, 2017, 8 pages, Prague, Czech.

Catt, "Remaining details of pre-emption indication", 3GPP TSG RAN WG1 Meeting #90bis, R1-1717838, Oct. 9-13, 2017, 7 pages, Prague, Czech.

Institute for Information Industry (III), "Considerations for UCI for URLLC", 3GPP TSG RAN WG1 Meeting 91, R1-1720840, Nov. 27-Dec. 1, 2017, 4 pages, Reno, USA.

Vivo, "Multiplexing data with different transmission durations", 3GPP TSG RAN WG1 Meeting AH 1801, R1-1800205, Jan. 22-26, 2018, 6 pages, Vancouver, Canada.

Pederson, K. et al., "Punctured Scheduling for Critical Low Latency Data on a Shared Channel with Mobile Broadband", IEEE 86th Vehicular Technology Conference, Sep. 24-27, 2017, 9 pages.

* cited by examiner

INFORMATION TRANSMISSION METHOD AND APPARATUS

CROSS-REFERENCE TO RELATED APPLICATIONS

This application is a continuation of International Patent Application No. PCT/CN2019/074500, filed on Feb. 1, 2019, which claims priority to Chinese Patent Application No. 201810150954.9, filed on Feb. 13, 2018, and claims priority to Chinese Patent Application No. 201810301984.5, filed on Apr. 4, 2018. The disclosures of the aforementioned applications are hereby incorporated by reference in their entireties.

TECHNICAL FIELD

This application relates to the communications field, and more specifically, to an information transmission method and an apparatus.

BACKGROUND

Existing 5G new radio may support an enhanced mobile broadband (Enhanced Mobile Broad Band, eMBB) technology and an ultra-reliable and low-latency communication (URLLC) technology. The eMBB technology meets a requirement of a high data rate, and may be used to transmit an eMBB service. The URLLC technology meets a requirement of low latency and high reliability, and is used to transmit a URLLC service.

In the prior art, a network device first schedules a terminal device that supports the eMBB service to transmit the eMBB service on a first time domain resource, and then schedules a terminal device that supports the URLLC service to transmit the URLLC service on the first time domain resource. In this case, if two services are simultaneously transmitted on the first time domain resource, transmission of the two services interferes with each other. Especially for the URLLC service, transmission reliability is severely reduced, and overall signal transmission performance is reduced.

Therefore, a technology needs to be provided to help improve the signal transmission performance.

SUMMARY

This application provides an information transmission method and an apparatus, to improve signal transmission performance.

According to a first aspect, an information transmission method is provided. The method includes: determining, by a terminal device, a target time domain interval, where a time domain resource in the target time domain interval includes at least one candidate time domain resource; receiving, by the terminal device, first resource indication information on a first candidate time domain resource in the at least one candidate time domain resource, where the first resource indication information is used to indicate a first time domain resource, the first time domain resource at least partially overlaps a second time domain resource, and the second time domain resource is used to carry a first uplink signal; and prohibiting, by the terminal device based on the first resource indication information, sending of at least a part of the first uplink signal.

Therefore, according to the information transmission method provided in this embodiment of this application, by detecting the at least one candidate time domain resource in the target time domain interval, the terminal device may prohibit, based on the first resource indication information that is detected on the first candidate time domain resource and that is used to indicate the first time domain resource, sending of at least the part of the uplink signal carried on the second time domain resource, where the second time domain resource at least partially overlaps the first time domain resource. In this way, inter-signal interference caused due to simultaneous transmission of uplink signals in an overlapped area between the first time domain resource and the second time domain resource is avoided, and especially timely transmission of a URLLC service carried on the first time domain resource is ensured, thereby improving overall signal transmission performance.

Optionally, the time domain resource in the target time domain interval belongs to a time domain resource set that is pre-configured; and the method further includes: prohibiting, by the terminal device, detection of the first resource indication information on at least one candidate time domain resource in the time domain resource set outside the target time domain interval.

Therefore, according to the information transmission method provided in this embodiment of this application, the terminal device determines a part of a time domain interval in the time domain resource set as the target time domain interval, thereby shortening a time domain interval for detecting the first resource indication information, further reducing power consumption and detection complexity of the terminal device, and improving scheduling flexibility.

Optionally, the time domain resource in the target time domain interval belongs to a time domain resource set that is pre-configured; and the method further includes: detecting, by the terminal device, the first resource indication information in the target time domain interval by using first-type time domain configuration information; and detecting, by the terminal device, second resource indication information on at least one candidate time domain resource in the time domain resource set outside the target time domain interval by using second-type time domain configuration information, where the second resource indication information is used to indicate the second time domain resource, and a periodicity or duration corresponding to the first-type time domain configuration information is less than a periodicity or duration corresponding to the second-type time domain configuration information.

Time domain configuration information may be a detection periodicity of indication information, for example, a slot, a mini slot, two symbols, four symbols, or seven symbols. The first-type time domain configuration information and the second-type time domain configuration information are independently configured. The time domain configuration information may alternatively be a time unit. Duration of the time unit may be a slot, a mini slot, or the like.

Optionally, a start moment of the target time domain interval is determined based on a time domain interval of a third time domain resource carrying the second resource indication information, and the second resource indication information is used to indicate the second time domain resource.

Therefore, according to the information transmission method provided in this embodiment of this application, when the first uplink signal is an aperiodic signal, the terminal device may detect a candidate time domain resource possibly carrying the first resource indication information, based on the start moment of the target time domain interval in the time domain interval of the third time domain resource carrying the second resource indication information and from a time at which a network device starts to schedule the terminal device to send the first uplink signal. In this way, the terminal device can detect the first resource indication information as efficient as possible without wasting power.

Optionally, the start moment of the target time domain interval is any one of the following: a start moment of the time domain interval of the third time domain resource; an end moment of the time domain interval of the third time domain resource; a moment of preset duration after the start moment of the time domain interval of the third time domain resource; and a moment of preset duration after the end moment of the time domain interval of the third time domain resource.

Optionally, a start moment of the target time domain interval is determined based on a time domain interval of the second time domain resource.

Therefore, according to the information transmission method provided in this embodiment of this application, the start moment of the target time domain interval is determined based on the time domain interval of the second time domain resource. When the first uplink signal is a periodic signal, the terminal device may detect a candidate time domain resource possibly carrying the first resource indication information, from a time at which the first uplink signal starts to be sent. In this way, the terminal device can detect the first resource indication information as efficient as possible without wasting power.

Optionally, the start moment of the target time domain interval is any one of the following: a start moment of the time domain interval of the second time domain resource; and a moment of preset duration before the start moment of the time domain interval of the second time domain resource.

Optionally, an end moment of the target time domain interval is any one of the following: the start moment of the time domain interval of the second time domain resource; an end moment of the time domain interval of the second time domain resource; the moment of the preset duration before the start moment of the time domain interval of the second time domain resource; and a moment of preset duration before the end moment of the time domain interval of the second time domain resource.

According to a second aspect, an information transmission method is provided. The method includes: determining, by a terminal device, a target time domain interval, where a time domain resource in the target time domain interval includes at least one candidate time domain resource; receiving, by the terminal device, first resource indication information on a first candidate time domain resource in the at least one candidate time domain resource, where the first resource indication information is used to indicate a first time domain resource, the first time domain resource at least partially overlaps a second time domain resource, and the second time domain resource is used to carry a first uplink signal; and skipping, by the terminal device based on the first resource indication information, sending at least a part of the first uplink signal.

Optionally, the time domain resource in the target time domain interval belongs to a time domain resource set that is pre-configured; and the method further includes: skipping, by the terminal device, detecting the first resource indication information on at least one candidate time domain resource in the time domain resource set outside the target time domain interval.

According to a third aspect, an information transmission method is provided. The method includes: receiving, by a terminal device, first resource indication information, where the first resource indication information is used to indicate a first time domain resource, the first time domain resource at least partially overlaps a second time domain resource, and the second time domain resource is used to carry a first uplink signal; detecting, by the terminal device, first indication information, where the first indication information is used to indicate a transmission attribute of the first time domain resource; and sending, by the terminal device, the first uplink signal based on the first resource indication information and a detection result of the first indication information; or prohibiting, by the terminal device based on the first resource indication information and a detection result of the first indication information, sending of at least a part of the first uplink signal.

Therefore, according to the information transmission method provided in this embodiment of this application, the terminal device not only can determine, based on the first resource indication information used to indicate the first time domain resource, whether to send at least the part of the first uplink signal carried on the second time domain resource, but also can determine, based on the detection result of the first indication information used to indicate the transmission attribute of the first time domain resource, whether to send at least the part of the first uplink signal. In this way, timely transmission of an uplink signal carried on the first time domain resource is ensured, and timely transmission of the first uplink signal carried on the second time domain resource can also be ensured as much as possible, thereby improving overall signal transmission reliability, and improving system scheduling flexibility. Especially, when there is an overlapped area between the first time domain resource and the second time domain resource but uplink signals may be separately sent in a frequency division multiplexing manner, this embodiment of this application has good applicability.

Optionally, the first indication information includes slot format information, the slot format information is used to indicate a transmission direction of the first time domain resource, and the transmission direction is an uplink transmission direction or a non-uplink transmission direction.

Optionally, the sending, by the terminal device, the first uplink signal based on the first resource indication information and a detection result of the first indication information; or prohibiting, by the terminal device based on the first resource indication information and a detection result of the first indication information, sending of at least a part of the first uplink signal includes: if the terminal device fails to detect the slot format information, prohibiting, by the terminal device, sending of at least the part of the first uplink signal; if the terminal device detects the slot format information successfully and the slot format information indicates that the transmission direction of the first time domain resource is a non-uplink transmission direction, prohibiting, by the terminal device, sending of at least the part of the first uplink signal; or if the terminal device detects the slot format information successfully and the slot format information indicates that the transmission direction of the first time domain resource is an uplink transmission direction, sending, by the terminal device, the first uplink signal.

Optionally, the sending, by the terminal device, the first uplink signal based on the first resource indication information and a detection result of the indication information; or prohibiting, by the terminal device based on the first resource indication information and a detection result of the first indication information, sending of at least a part of the first uplink signal includes: if the terminal device fails to detect the slot format information, sending, by the terminal device, the first uplink signal; if the terminal device detects the slot format information successfully and the slot format information indicates that the transmission direction of the first time domain resource is an uplink transmission direction, sending, by the terminal device, the first uplink signal; or if the terminal device detects the slot format information successfully and the slot format information indicates that the transmission direction of the first time domain resource is a non-uplink transmission direction, prohibiting, by the terminal device, sending of at least the part of the first uplink signal.

Optionally, the first uplink signal is any one of the following:
a signal carried on a grant-free uplink data channel;
a signal carried on a semi-persistent scheduling uplink data channel;
a periodic sounding reference signal SRS;
periodic channel state information CSI; and
a periodic random access signal.

According to a fourth aspect, an information transmission method is provided. The method includes: receiving, by a terminal device, first resource indication information, where the first resource indication information is used to indicate a first time domain resource, the first time domain resource at least partially overlaps a second time domain resource, and the second time domain resource is used to carry a first uplink signal; detecting, by the terminal device, first indication information, where the first indication information is used to indicate a transmission attribute of the first time domain resource; and sending, by the terminal device, the first uplink signal based on the first resource indication information and a detection result of the first indication information; or skipping, by the terminal device based on the first resource indication information and a detection result of the first indication information, sending at least a part of the first uplink signal.

Optionally, the first indication information includes slot format information, the slot format information is used to indicate a transmission direction of the first time domain resource, and the transmission direction is an uplink transmission direction or a non-uplink transmission direction.

Optionally, the sending, by the terminal device, the first uplink signal based on the first resource indication information and a detection result of the first indication information; or skipping, by the terminal device based on the first resource indication information and a detection result of the first indication information, sending at least a part of the first uplink signal includes: if the terminal device fails to detect the slot format information, skipping, by the terminal device, sending at least the part of the first uplink signal; if the terminal device detects the slot format information successfully and the slot format information indicates that the transmission direction of the first time domain resource is a non-uplink transmission direction, skipping, by the terminal device, sending at least the part of the first uplink signal; or if the terminal device detects the slot format information successfully and the slot format information indicates that the transmission direction of the first time domain resource is an uplink transmission direction, sending, by the terminal device, the first uplink signal.

Optionally, the sending, by the terminal device, the first uplink signal based on the first resource indication information and a detection result of the first indication information; or skipping, by the terminal device based on the first resource indication information and a detection result of the first indication information, sending at least a part of the first uplink signal includes: if the terminal device fails to detect the slot format information, sending, by the terminal device, the first uplink signal; if the terminal device detects the slot format information successfully and the slot format information indicates that the transmission direction of the first time domain resource is an uplink transmission direction, sending, by the terminal device, the first uplink signal; or if the terminal device detects the slot format information successfully and the slot format information indicates that the transmission direction of the first time domain resource is a non-uplink transmission direction, skipping, by the terminal device, sending at least the part of the first uplink signal.

According to a fifth aspect, an information transmission method is provided. The method includes: sending, by a network device, first resource indication information on a first candidate time domain resource in a target time domain interval, where the first candidate time domain resource belongs to at least one candidate time domain resource in the target time domain interval, the first resource indication information is used to indicate a first time domain resource, the first time domain resource at least partially overlaps a second time domain resource, and the second time domain resource is used to carry a first uplink signal; and prohibiting, by the network device, detection of at least a part of the first uplink signal on at least a part of the first time domain resource.

Optionally, a time domain resource in the target time domain interval belongs to a time domain resource set that is pre-configured; and the method further includes: prohibiting, by the network device, sending of the first resource indication information on at least one candidate time domain resource in the time domain resource set outside the target time domain interval.

Optionally, a time domain resource in the target time domain interval belongs to a time domain resource set that is pre-configured; and the method further includes: prohibiting, by the network device, sending of the first resource indication information in the target time domain interval by using first-type time domain configuration information; and sending, by the network device, second resource indication information on at least one candidate time domain resource in the time domain resource set outside the target time domain interval by using second-type time domain configuration information, where the second resource indication information is used to indicate the second time domain resource, and a periodicity or duration corresponding to the first-type time domain configuration information is less than a periodicity or duration corresponding to the second-type time domain configuration information.

Time domain configuration information may be a detection periodicity of indication information, for example, a slot, a mini slot, two symbols, four symbols, or seven symbols. The first-type time domain configuration information and the second-type time domain configuration information are independently configured. The time domain configuration information may alternatively be a time unit. Duration of the time unit may be a slot, a mini slot, or the like.

Optionally, a start moment of the target time domain interval is determined based on a time domain interval of a third time domain resource carrying the second resource indication information, and the second resource indication information is used to indicate the second time domain resource.

Optionally, the start moment of the target time domain interval is any one of the following:

a start moment of the time domain interval of the third time domain resource;

an end moment of the time domain interval of the third time domain resource;

a moment of preset duration after the start moment of the time domain interval of the third time domain resource; and a moment of preset duration after the end moment of the time domain interval of the third time domain resource.

Optionally, a start moment of the target time domain interval is determined based on a time domain interval of the second time domain resource.

Optionally, the start moment of the target time domain interval is any one of the following: a start moment of the time domain interval of the second time domain resource; and a moment of preset duration before the start moment of the time domain interval of the second time domain resource.

Optionally, an end moment of the target time domain interval is any one of the following:

the start moment of the time domain interval of the second time domain resource;

an end moment of the time domain interval of the second time domain resource;

the moment of the preset duration before the start moment of the time domain interval of the second time domain resource; and a moment of preset duration before the end moment of the time domain interval of the second time domain resource.

According to a sixth aspect, an information transmission method is provided. The method includes: sending, by a network device, first resource indication information on a first candidate time domain resource in a target time domain interval, where the first candidate time domain resource belongs to at least one candidate time domain resource in the target time domain interval, the first resource indication information is used to indicate a first time domain resource, the first time domain resource at least partially overlaps a second time domain resource, and the second time domain resource is used to carry a first uplink signal; and skipping, by the network device, detecting at least a part of the first uplink signal on at least a part of the first time domain resource.

Optionally, a time domain resource in the target time domain interval belongs to a time domain resource set that is pre-configured; and the method further includes: skipping, by the network device, sending the first resource indication information on at least one candidate time domain resource in the time domain resource set outside the target time domain interval.

According to a seventh aspect, an information transmission method is provided. The method includes: sending, by a network device, first resource indication information on a first candidate time domain resource in a target time domain interval, where the first candidate time domain resource belongs to at least one candidate time domain resource in the target time domain interval, the first resource indication information is used to indicate a first time domain resource, the first time domain resource at least partially overlaps a second time domain resource, and the second time domain resource is used to carry a first uplink signal; and determining, by the network device, that at least a part of the first uplink signal does not exist on at least a part of the first time domain resource.

According to an eighth aspect, an information transmission method is provided. The method includes: sending, by a network device, first resource indication information, where the first resource indication information is used to indicate a first time domain resource, the first time domain resource at least partially overlaps a second time domain resource, and the second time domain resource is used to carry a first uplink signal; and if the network device does not send slot format information, prohibiting, by the network device, detection of at least a part of the first uplink signal on at least a part of the first time domain resource; if the network device sends slot format information and the slot format information indicates that a transmission direction of the first time domain resource is a non-uplink transmission direction, prohibiting, by the network device, detection of at least a part of the first uplink signal on at least a part of the first time domain resource; or if the network device sends slot format information and the slot format information indicates that a transmission direction of the first time domain resource is an uplink transmission direction, receiving, by the network device, the first uplink signal on the first time domain resource, where the slot format information is used to indicate the transmission direction of the first time domain resource, and the transmission direction is an uplink transmission direction or a non-uplink transmission direction.

Optionally, the first uplink signal is any one of the following:

a signal carried on a grant-free uplink data channel;

a signal carried on a semi-persistent scheduling uplink data channel;

a periodic sounding reference signal SRS;

periodic channel state information CSI; and a periodic random access signal.

According to a ninth aspect, an information transmission method is provided. The method includes: sending, by a network device, first resource indication information, where the first resource indication information is used to indicate a first time domain resource, the first time domain resource at least partially overlaps a second time domain resource, and the second time domain resource is used to carry a first uplink signal; if the network device does not send slot format information, skipping, by the network device, detecting at least a part of the first uplink signal on at least a part of the first time domain resource; if the network device sends slot format information and the slot format information indicates that a transmission direction of the first time domain resource is a non-uplink transmission direction, skipping, by the network device, detecting at least a part of the first uplink signal on at least a part of the first time domain resource; or if the network device sends slot format information and the slot format information indicates that a transmission direction of the first time domain resource is an uplink transmission direction, receiving, by the network device, the first uplink signal on the first time domain resource, where the slot format information is used to indicate the transmission direction of the first time domain resource, and the transmission direction is an uplink transmission direction or a non-uplink transmission direction.

According to a tenth aspect, an information transmission method is provided. The method includes: sending, by a network device, first resource indication information, where the first resource indication information is used to indicate a first time domain resource, the first time domain resource at least partially overlaps a second time domain resource, and the second time domain resource is used to carry a first uplink signal; and if the network device does not send slot format information, determining, by the network device, that at least a part of the first uplink signal does not exist on at least a part of the first time domain resource; if the network device sends slot format information and the slot format information indicates that a transmission direction of the first time domain resource is a non-uplink transmission direction, determining, by the network device, at least a part of the first uplink signal does not exist on at least a part of the first time domain resource; or if the network device sends slot format information and the slot format information indicates that a transmission direction of the first time domain resource is an uplink transmission direction, receiving, by the network device, the first uplink signal on the first time domain resource, where the slot format information is used to indicate the transmission direction of the first time domain resource, and the transmission direction is an uplink transmission direction or a non-uplink transmission direction.

According to an eleventh aspect, an information transmission method is provided. The method includes: sending, by a network device, first resource indication information, where the first resource indication information is used to indicate a first time domain resource, the first time domain resource at least partially overlaps a second time domain resource, and the second time domain resource is used to carry a first uplink signal; and if the network device does not send slot format information, receiving, by the network device, the first uplink signal on the first time domain resource; if the network device sends slot format information and the slot format information indicates that a transmission direction of the first time domain resource is an uplink transmission direction, receiving, by the network device, the first uplink signal on the first time domain resource; or if the network device sends slot format information and the slot format information indicates that a transmission direction of the first time domain resource is a non-uplink transmission direction, prohibiting, by the network device, detection of at least a part of the first uplink signal on at least a part of the first time domain resource.

Optionally, the first uplink signal is any one of the following:

a signal carried on a grant-free uplink data channel;
a signal carried on a semi-persistent scheduling uplink data channel;
a periodic sounding reference signal SRS;
periodic channel state information CSI; and
a periodic random access signal.

According to a twelfth aspect, an information transmission method is provided. The method includes: sending, by a network device, first resource indication information, where the first resource indication information is used to indicate a first time domain resource, the first time domain resource at least partially overlaps a second time domain resource, and the second time domain resource is used to carry a first uplink signal; and if the network device does not send slot format information, receiving, by the network device, the first uplink signal on the first time domain resource; if the network device sends slot format information and the slot format information indicates that a transmission direction of the first time domain resource is an uplink transmission direction, receiving, by the network device, the first uplink signal on the first time domain resource; or if the network device sends slot format information and the slot format information indicates that a transmission direction of the first time domain resource is a non-uplink transmission direction, skipping, by the network device, detecting at least a part of the first uplink signal on at least a part of the first time domain resource.

According to a thirteenth aspect, an information transmission method is provided. The method includes: sending, by a network device, first resource indication information, where the first resource indication information is used to indicate a first time domain resource, the first time domain resource at least partially overlaps a second time domain resource, and the second time domain resource is used to carry a first uplink signal; and if the network device does not send slot format information, receiving, by the network device, the first uplink signal on the first time domain resource; if the network device sends slot format information and the slot format information indicates that a transmission direction of the first time domain resource is an uplink transmission direction, receiving, by the network device, the first uplink signal on the first time domain resource; or if the network device sends slot format information and the slot format information indicates that a transmission direction of the first time domain resource is a non-uplink transmission direction, determining, by the network device, that at least a part of the first uplink signal does not exist on at least a part of the first time domain resource.

According to a fourteenth aspect, an information transmission apparatus is provided. The apparatus may be configured to perform operations of the terminal device in any one of the first aspect to the fourth aspect and the possible implementations of the first aspect to the fourth aspect. Specifically, the apparatus may include modules or units configured to perform the operations of the terminal device in any one of the possible implementations of the first aspect to the fourth aspect.

According to a fifteenth aspect, an information transmission apparatus is provided. The apparatus may be configured to perform operations of the network device in any one of the fifth aspect to the thirteenth aspect and the possible implementations of the fifth aspect to the thirteenth aspect. Specifically, the apparatus may include modules or units configured to perform the operations of the network device in any one of the possible implementations of the fifth aspect to the thirteenth aspect.

According to a sixteenth aspect, a terminal device is provided. The terminal device includes a processor, a transceiver, and a memory. The processor, the transceiver, and the memory communicate with each other through an inner connection path. The memory is configured to store an instruction, and the processor is configured to execute the instruction stored in the memory. When the processor executes the instruction stored in the memory, the execution enables the terminal device to perform the method according to any one of the possible implementations of the first aspect to the fourth aspect, or the execution enables the terminal device to implement the apparatus provided in the fourteenth aspect.

According to a seventeenth aspect, a network device is provided. The network device includes a processor, a transceiver, and a memory. The processor, the transceiver, and the memory communicate with each other through an inner connection path. The memory is configured to store an instruction, and the processor is configured to execute the instruction stored in the memory. When the processor executes the instruction stored in the memory, the execution enables the network device to perform the method in any one of the possible implementations of the fifth aspect to the thirteenth aspect, or the execution enables the network device to implement the apparatus provided in the fifteenth aspect.

According to an eighteenth aspect, a chip system is provided, including a memory and a processor. The memory is configured to store a computer program, and the processor is configured to invoke the computer program from the memory and run the computer program, so that a communications device on which the chip system is installed performs the method in any one of the first aspect to the thirteenth aspect and the possible implementations of the first aspect to the thirteenth aspect.

According to a nineteenth aspect, a computer program product is provided. The computer program product includes computer program code. When the computer program code is run by a communications unit, a processing unit or a transceiver, and a processor of a communications device (such as a network device or a terminal device), the communications device is enabled to perform the method in any one of the first aspect to the thirteenth aspect and the possible implementations of the first aspect to the thirteenth aspect.

According to a twentieth aspect, a computer-readable storage medium is provided. The computer-readable storage medium stores a program. The program enables a communications device (such as a network device or a terminal device) to perform the method in any one of the first aspect to the thirteenth aspect and the possible implementations of the first aspect to the thirteenth aspect.

According to a twenty-first aspect, a computer program is provided. When the computer program is executed on a computer, the computer is enabled to implement the method in any one of the first aspect to the thirteenth aspect and the possible implementations of the first aspect to the thirteenth aspect.

In some of the foregoing implementations, that the first time domain resource at least partially overlaps the second time domain resource includes any one of the following:

the first time domain resource belongs to the second time domain resource, in other words, the second time domain resource includes the first time domain resource;

the first time domain resource partially overlaps the second time domain resource;

the second time domain resource belongs to the first time domain resource, in other words, the first time domain resource includes the second time domain resource; and the first time domain resource completely overlaps the second time domain resource.

In some of the foregoing implementations, the transmission attribute of the first time domain resource includes any one of the following: the transmission direction of the first time domain resource, whether the first time domain resource can be used for transmission, interference intensity of the first time domain resource, signal strength of the first time domain resource, and a modulation and coding scheme of the first time domain resource.

In some of the foregoing implementations, the sending, by the terminal device, the first uplink signal based on the first resource indication information and a detection result of the indication information includes: if the terminal device detects the slot format information, the slot format information indicates that the transmission direction of the first time domain resource is an uplink transmission direction, and a time domain resource carrying the slot format information is not earlier than a time domain resource carrying the first resource indication information, sending, by the terminal device, the first uplink signal.

In some of the foregoing implementations, if the network device sends slot format information and the slot format information indicates that the transmission direction of the first time domain resource is an uplink transmission direction, the receiving, by the network device, the first uplink signal on the first time domain resource includes: if the network device does not send the slot format information on a time domain resource earlier than the time domain resource carrying the first resource indication information and the slot format information indicates that the transmission direction of the first time domain resource is an uplink transmission direction, receiving, by the network device, the first uplink signal on the first time domain resource.

In some of the foregoing implementations, the first resource indication information is first uplink grant information.

In some of the foregoing implementations, the second resource indication information is second uplink grant information.

DETAILED DESCRIPTION OF ILLUSTRATIVE EMBODIMENTS

Figure 1:
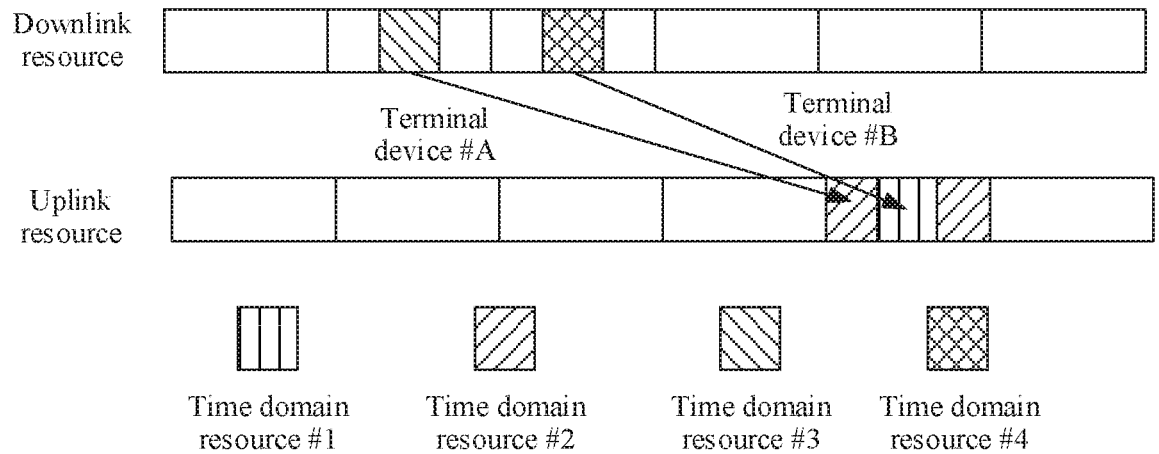
FIG. 1 is a schematic diagram of a time domain resource used to schedule an eMBB service and a time domain resource used to schedule a URLLC service in the prior art.

The following describes technical solutions in this application with reference to the accompanying drawings.

The technical solutions in embodiments of this application may be applied to various communications systems, such as: a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a $5^{th}$ generation (5G) system, or a new radio (NR) system.

A terminal device in the embodiments of this application may also be referred to as user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

A network device in the embodiments of this application may be a device configured to communicate with the terminal device. The network device may be a base transceiver station (BTS) in the global system for mobile communications (GSM) or the code division multiple access (CDMA) system, a NodeB (NB) in the wideband code division multiple access (WCDMA) system, an evolved NodeB (Evolutional NodeB, eNB or eNodeB) in the LTE system, or a radio controller in a cloud radio access network (CRAN) scenario. Alternatively, the network device may be a relay node, an access point, a vehicle-mounted device, a wearable device, a network device in the future 5G network, a network device in the future evolved PLMN network, or the like. This is not limited in the embodiments of this application.

First, a concept of a time unit in the embodiments of this application is briefly described.

In the embodiments of this application, a time domain resource used by the network device and the terminal device to transmit information may be divided into a plurality of time units in time domain. In addition, the plurality of time units may be consecutive, or a preset interval may be set between some adjacent time units. This is not particularly limited in the embodiments of this application.

In the embodiments of this application, the length of one time unit may be randomly set, and is not particularly limited in the embodiments of this application.

For example, one time unit may include one or more subframes; or one time unit may include one or more slots; or one time unit may include one or more symbols; or one time unit may include one or more TTIs; or one time unit may include one or more short transmission time intervals (sTTIs).

The following briefly describes a problem of the prior art by using FIG. 1. As shown in FIG. 1, a terminal device #A is a terminal device that supports an eMBB service, and a terminal device #B is a terminal device that supports a URLLC service. A network device schedules, by using radio resource control (RRC) signaling or resource indication information carried on a time domain resource #3, the terminal device #A to transmit the eMBB service on a time domain resource #2; and schedules, by using resource indication information carried on a time domain resource #4, the terminal device #B to transmit the URLLC service on a time domain resource #1. In this way, if a resource in an overlapped area between the time domain resource #1 and the time domain resource #2 simultaneously carries the two services, transmission of the two services is interfered. Especially, transmission performance of the URLLC service that has a high requirement on latency and reliability is severely affected.

Therefore, to resolve the foregoing problem, this application provides an information transmission method to help improve signal transmission performance.

The terminal device in the embodiments of this application may be a terminal device that supports transmission of the eMBB service. As described above, the terminal device that supports the eMBB service is denoted as a terminal device #A, and the terminal device #A is any one of terminal devices that support the eMBB service.

Figure 2:
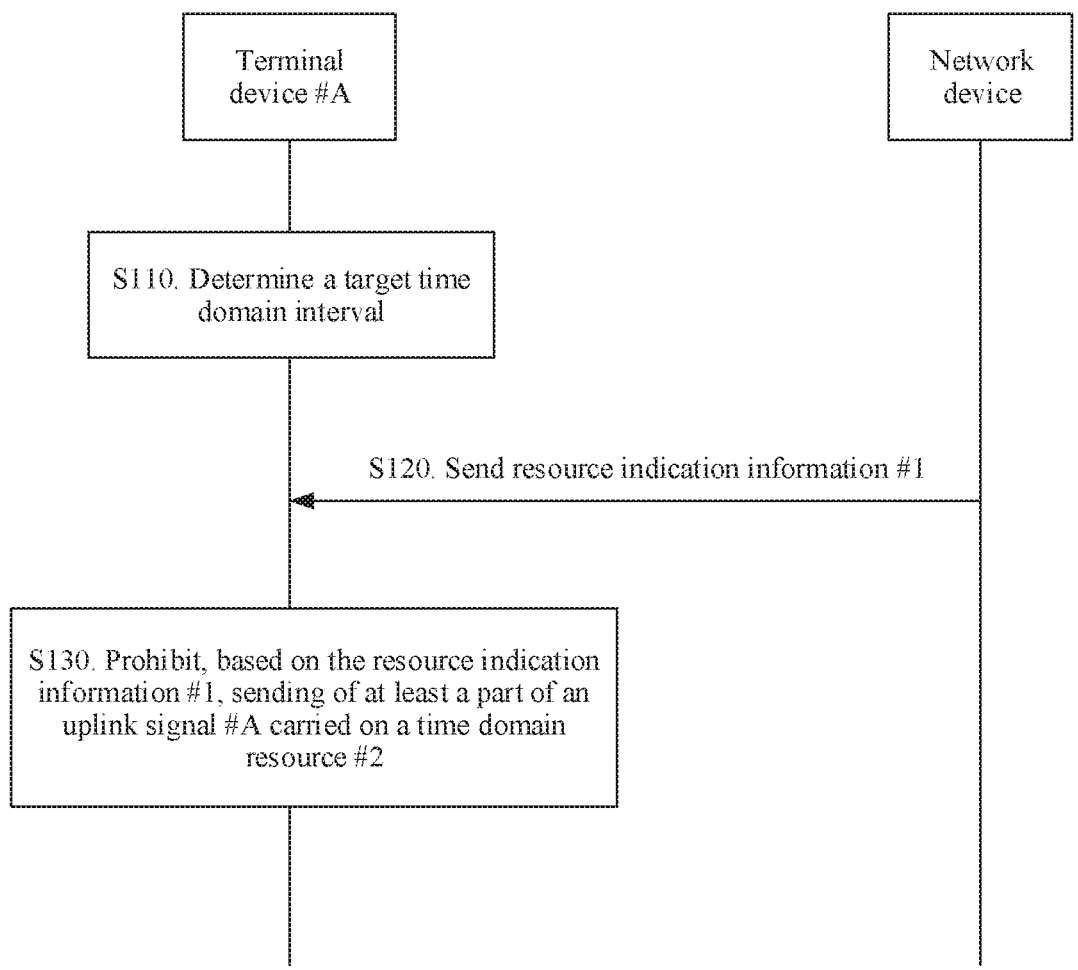
FIG. 2 is a schematic interaction diagram of an information transmission method according to an embodiment of this application.
Figure 3:
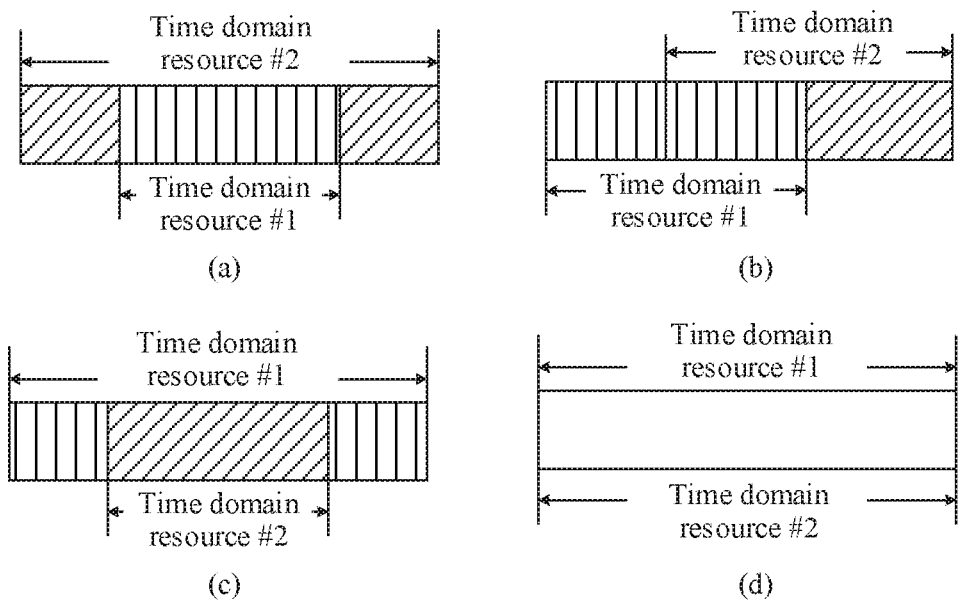
FIG. 3 is a schematic diagram of a first time domain resource and a second time domain resource according to an embodiment of this application.
Figure 4:
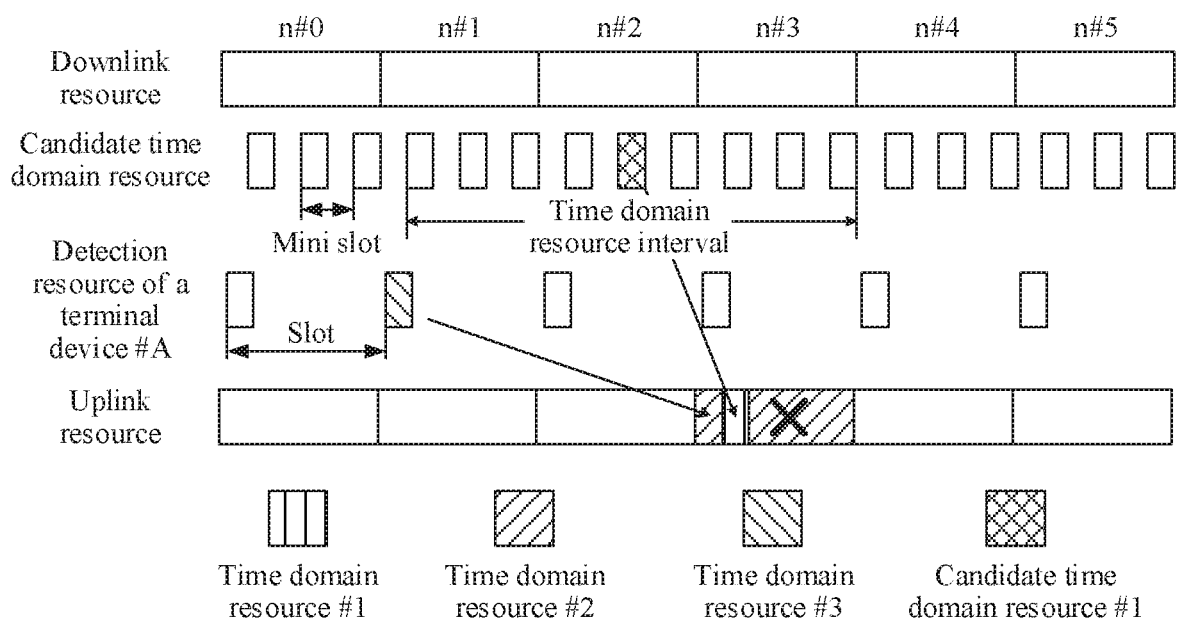
FIG. 4 is a schematic diagram of a time domain resource used to schedule an eMBB service and a time domain resource used to schedule a URLLC service according to an embodiment of this application.

The following describes the embodiments of this application in detail by using FIG. 2 to FIG. 4.

FIG. 2 is a schematic interaction diagram of an information transmission method 100 according to an embodiment of this application. Each step of the method 100 is described in detail below.

Before step S110, the terminal device #A determines a time domain resource (denoted as a time domain resource #2 for ease of identification and understanding) by using resource indication information (denoted as resource indication information #2 for ease of identification and understanding) sent by a network device. The time domain resource #2 is used to carry a first uplink signal (denoted as an uplink signal #A for ease of identification and understanding). The uplink signal #A may correspond to data or information of an eMBB service.

In this embodiment of this application, the uplink signal #A may be a periodic signal or an aperiodic signal. The following separately describes two cases in which the uplink signal #A is a periodic signal and the uplink signal #A is an aperiodic signal.

Case 1 (the Uplink Signal #A is an Aperiodic Signal)

Optionally, the resource indication information #2 may be uplink grant information, and the uplink grant information may be carried on a downlink control channel.

Correspondingly, the uplink signal #A may be uplink data scheduled by using the uplink grant information, and the uplink signal #A may be carried on an uplink data channel.

Optionally, the resource indication information #2 may be downlink assignment information, the downlink assignment information may be carried on a downlink control channel, and the downlink assignment information may be used to schedule a downlink data channel. Correspondingly, the uplink signal #A may be uplink feedback information corresponding to downlink data carried on the downlink data channel. For example, the uplink feedback information includes acknowledgment ACK or negative acknowledgment NACK information, and the ACK or NACK information is carried on an uplink control channel or an uplink data channel.

Optionally, the resource indication information #2 may be a trigger identifier, the trigger identifier may be carried on a downlink control channel, and the downlink control channel may be a control channel that carries uplink grant information or downlink assignment information; or the downlink control channel may be a control channel that does not carry uplink grant information or downlink assignment information. Correspondingly, the uplink signal #A is an uplink aperiodic sounding reference signal (SRS) or uplink aperiodic channel state information (CSI) triggered by the trigger identifier, and the uplink aperiodic CSI may be carried on an uplink control channel or an uplink data channel.

Case 2 (the Uplink Signal #A is a Periodic Signal)

Specifically, the uplink signal #A may be a periodic signal configured by using the resource indication information #2. The resource indication information #2 may be configuration signaling, and the configuration signaling may be radio resource control (RRC) signaling, media access control (MAC) signaling, or physical layer signaling. The configuration signaling may be used to configure a transmission periodicity and a time domain resource offset of periodic signaling. The uplink signal #A may be at least one of the following signals: a signal carried on a grant-free uplink data channel, a signal carried on a semi-persistent scheduling uplink data channel, a periodic SRS, periodic CSI, a periodic scheduling request (SR), a periodic random access signal, and the like.

The grant-free uplink data channel may also be referred to as a configuration grant-based uplink data channel. Specifically, hybrid automatic repeat request (HARQ) initial transmission is generally carried on an uplink data channel dynamically scheduled by using the uplink grant information on the downlink control channel. However, HARQ initial transmission of the configuration grant-based uplink data channel may not need to be scheduled by using the downlink control channel at all. In other words, the HARQ initial transmission of the configuration grant-based uplink data channel may be scheduled once by using a semi-persistent scheduling downlink control channel, and subsequent series of HARQ initial transmission may not need to be scheduled by using the downlink control channel.

In S110, the terminal device #A determines a target time domain interval, where a time domain resource in the target time domain interval includes at least one candidate time domain resource.

The candidate time domain resource is used to carry resource indication information #1 (that is, first resource indication information), and the resource indication information #1 is used to indicate a time domain resource #1 (which is an example of a first time domain resource). The time domain resource #1 at least partially overlaps the time domain resource #2 (which is an example of a second time domain resource), and the time domain resource #2 is used to carry the uplink signal #A (which is an example of the first uplink signal).

Specifically, a start moment of the target time domain interval may be a start moment of a time domain interval of the time domain resource #2 or may be before a start moment of a time domain interval of the time domain resource #2. The time domain resource in the target time domain interval includes at least one candidate time domain resource. Each candidate time domain resource is a preset resource that may be used to carry the resource indication information #1, and each candidate time domain resource includes at least one time unit.

It may be understood that when at least a part of the time domain resource #2 is occupied by another uplink signal, severe mutual interference exists between the uplink signal #A and the signal that occupies the time domain resource #2, affecting reliability of transmission of the uplink signal #A and transmission of the another uplink signal. To avoid or mitigate such interference, the network device may send the resource indication information #1 to the terminal device #A, so that in an overlapped part between the resource indicated by the resource indication information #1 and the resource indicated by the resource indication information #2, the resource indication information #1 overrides the resource indication information #2. Correspondingly, to determine whether the time domain resource #2 is occupied by another uplink signal, the terminal device #A detects a downlink time domain resource. In this case, the terminal device #A may determine, by detecting a downlink time domain resource in the target time domain interval, whether the time domain resource #2 is occupied by another uplink signal.

Therefore, the terminal device #A may detect the resource indication information #1 on the at least one candidate time domain resource in the target time domain interval.

In other words, if the network device determines that another terminal device occupies the time domain resource #2 to send an uplink signal, the network device sends the resource indication information #1 on a candidate time domain resource in the at least one candidate time domain resource in the target time domain interval. The terminal device #A may detect the resource indication information #1 in the target time domain interval. If the resource indication information #1 is detected, it indicates that the time domain resource #1 indicated by the resource indication information #1 at least partially overlaps the time domain resource #2, that is, an uplink signal #B to be carried on the time domain resource #1 occupies a part of the time domain resource #2.

As shown in (a) in FIG. 3, the time domain resource #1 belongs to the time domain resource #2, or in other words, the time domain resource #2 includes the time domain resource #1.

As shown in (b) in FIG. 3, the time domain resource #1 partially overlaps the time domain resource #2.

As shown in (c) in FIG. 3, the time domain resource #2 belongs to the time domain resource #1, or in other words, the time domain resource #1 includes the time domain resource #2.

As shown in (d) in FIG. 3, the time domain resource #1 completely overlaps the time domain resource #2.

The time domain resource #1 is used to carry an uplink signal (denoted as the uplink signal #B for ease of identification and understanding) different from the uplink signal #A. For example, the uplink signal #B may correspond to data or information of a URLLC service.

It should be noted that the resource indication information #1 may also be referred to as preemption indication (PI) information.

In S120, the network device sends the resource indication information #1 to the terminal device #A on a candidate time domain resource #1 (which is an example of a first candidate time domain resource) in the target time domain resource, where the candidate time domain resource #1 belongs to the at least one candidate time domain resource in the target time domain interval.

In this way, the terminal device #A detects the resource indication information #1 on the at least one candidate time domain resource in the target time domain interval, and receives the resource indication information #1 on the candidate time domain resource #1.

In S130, the terminal device #A prohibits, based on the resource indication information #1, sending of at least a part of the uplink signal #A. Correspondingly, the network device prohibits detection of at least the part of the uplink signal #A on at least a part of the time domain resource #1.

In other words, based on the resource indication information #1, the terminal device does not send at least a part of the uplink signal #A.

Correspondingly, the network device determines that at least the part of the uplink signal #A does not exist on at least the part of the time domain resource #1, or the network device determines not to detect at least the part of the uplink signal #A on at least the part of the time domain resource #1.

Specifically, if the time domain resource #1 at least partially overlaps (that is, partially overlaps or completely overlaps) the time domain resource #2, the terminal device #A prohibits sending of all of the uplink signal #A on the time domain resource #2. In other words, provided that there is an overlapped area between the time domain resource #1 and the time domain resource #2, the terminal device #A does not send the uplink signal #A on the time domain resource #2. Correspondingly, if the network device determines that the uplink signal #A does not exist on the time domain resource #1, the network device does not detect the uplink signal #A on the time domain resource #1. Alternatively, if the time domain resource #2 partially overlaps the time domain resource #1, the terminal device #A prohibits sending of a part of the uplink signal #A carried in the overlapped area in the time domain resource #2, and may send a remaining part of the uplink signal #A outside the overlapped area in the time domain resource #2. Correspondingly, if the network device determines that a part of the uplink signal #A does not exist in the overlapped area, the network device does not detect the part of the uplink signal #A (that is, an uplink signal carried in the overlapped area) in the overlapped area, and may receive the remaining part of the uplink signal #A outside the overlapped area in the time domain resource #2.

Optionally, the terminal device #A detects the resource indication information #1 in the target time domain interval based on a first-type time unit.

Specifically, because the URLLC service has a relatively high requirement on latency and reliability, duration corresponding to a time unit (that is, the first-type time unit) of a time domain resource used to carry the URLLC service is relatively short. Correspondingly, duration corresponding to a time unit (denoted as a second-type time unit for ease of identification and understanding) of a time domain resource used to carry the eMBB service is relatively long. For example, the first-type time unit may be a mini slot, a quantity of symbols included in one mini slot is less than 14. The second-type time unit may be a slot, and one slot includes 14 symbols. Alternatively, a quantity of symbols included in one mini slot is less than 7, and one slot includes 7 symbols.

Therefore, for the terminal device #A supporting the eMBB service, the data or information (for example, the resource indication information #2) related to the eMBB service is detected based on the second-type time unit. Because the data or information (for example, the resource indication information #1) related to the URLLC service is introduced due to a burst of the URLLC service, the data or information related to the URLLC service may generally be detected based on the first-type time unit.

The following describes this embodiment of this application in detail with reference to a schematic diagram of a downlink time domain resource and an uplink time domain resource shown in FIG. 4, by using an example in which the first-type time unit is a mini slot and the second-type time unit is a slot.

As shown in FIG. 4, the downlink time domain resource and the uplink time domain resource each include slots numbered from n #0 to n #5. The terminal device #A receives the resource indication information #2 on a time domain resource #3 in the slot n #1, and determines, based on the resource indication information #2, to send the uplink signal #A in the slot n #3 (that is, on the time domain resource #2). The target time domain interval determined by the terminal device #A is a time domain interval corresponding to the slot #1 to the slot #3. The target time domain interval includes a plurality of candidate time domain resources. If the resource indication information #1 is detected on a time domain resource (namely, the candidate time domain resource #1) in the plurality of candidate time domain resources, and it is determined that another terminal device supporting the URLLC service sends an uplink signal on a part of a time domain resource (that is, the time domain resource #1) in the slot #3, sending of the uplink signal #A in the slot n #3 is prohibited.

Therefore, according to the information transmission method provided in this embodiment of this application, by detecting the at least one candidate time domain resource in the target time domain interval, the terminal device may prohibit, based on the first resource indication information that is detected on the first candidate time domain resource and that is used to indicate the first time domain resource, sending of at least a part of the uplink signal carried on the second time domain resource, where the second time domain resource at least partially overlaps the first time domain resource. In this way, inter-signal interference caused due to simultaneous transmission of uplink signals in an overlapped area between the first time domain resource and the second time domain resource is avoided, and especially timely transmission of a URLLC service carried on the first time domain resource is ensured, thereby improving overall signal transmission performance.

In this embodiment of this application, the resource indication information #1 may be information about at least one terminal device including the terminal device #A. In other words, after each terminal device (for example, the terminal device #A) in the at least one terminal device receives the resource indication information #1, the terminal device no longer sends an uplink signal on the time domain resource #2 based on the resource indication information #2, but prohibits sending of at least a part of the uplink signal on at least a part of the time domain resource #1.

In an optional embodiment, the resource indication information #1 may be uplink grant information #1 (which is an example of first uplink grant information) for the terminal device #A.

In other words, the uplink grant information #1 is used only for the terminal device #A, and is not used for a terminal device other than the terminal device #A.

As described above, optionally, the resource indication information #2 may be uplink grant information #2 (which is an example of second uplink grant information) for the terminal device #A.

Similarly, the uplink grant information #2 is used only for the terminal device #A, and is not used for a terminal device other than the terminal device #A.

The uplink grant information #1 and the uplink grant information #2 may be carried on different downlink control channels. Optionally, DCI formats of the uplink grant information #1 and the uplink grant information #2 are the same.

Specifically, before receiving the uplink grant indication information #1, the terminal device #A may send the uplink signal #A according to scheduling of the uplink grant indication information #2. After receiving the uplink grant indication information #1, the terminal device #A no longer sends the uplink signal #A according to the scheduling of the uplink grant indication information #2, but prohibits, based on the uplink grant indication information #1, sending of at least a part of an uplink signal scheduled by using the uplink grant indication information #2, or in other words, sends, on another resource, at least a part of the uplink signal #A scheduled by using the uplink grant indication information #2.

As described above, for the terminal device #A supporting the eMBB service, to detect the information (for example, the resource indication information #1) related to the URLLC service, the first-type time unit may be used to detect the resource indication information #1. This results in additional detection complexity and increased power consumption on the terminal device #A, and scheduling flexibility is affected. Therefore, this embodiment of this application further provides an optional implementation.

Optionally, a time domain resource in the target time domain interval belongs to a time domain resource set that is pre-configured; and the method further includes:

prohibiting, by the terminal device #A, detection of the resource indication information #1 on at least one candidate time domain resource in the time domain resource set outside the target time domain interval; or skipping, by the terminal device #A, detecting the resource indication information #1 on at least one candidate time domain resource in the time domain resource set outside the target time domain interval.

In other words, the time domain resource set is preconfigured by a system or the network device, and the time domain resource set includes a plurality of candidate time domain resources. The terminal device #A may obtain the time domain resource set by using higher layer signaling (for example, RRC signaling or MAC signaling) sent by the network device. Optionally, resources in the time domain resource set may be periodic resources. Specifically, resources in the time domain resource set may be in one periodicity.

Further, the terminal device #A may determine the target time domain interval in the time domain resource set, further detect the resource indication information #1 on a candidate time domain resource in the target time domain interval, and skip detecting the resource indication information #1 on at least one candidate time domain resource in the time domain resource set outside the target time domain interval.

It should be noted that the at least one candidate time domain resource in the time domain resource set outside the target time domain interval may be all candidate time domain resources in the time domain resource set outside the target time domain interval, or may be some of all candidate time domain resources in the time domain resource set outside the target time domain interval.

Optionally, the method further includes:

detecting, by the terminal device, the first resource indication information in the target time domain interval by using the first-type time unit; and detecting, by the terminal device, second resource indication information on the at least one candidate time domain resource in the time domain resource set outside the target time domain interval by using the second-type time unit, where the second resource indication information is used to indicate the second time domain resource, and duration corresponding to the first-type time unit is less than duration corresponding to the second-type time unit.

As described above, the data or information related to the URLLC service (for example, the resource indication information #1) may be detected by using the first-type time unit, and the data or information related to the eMBB service (for example, the resource indication information #2) may be detected by using the second-type time unit.

In this embodiment of this application, the terminal device #A may obtain the time domain resource set by using higher layer signaling (for example, RRC signaling or MAC signaling) sent by the network device. The following describes various manners in which the terminal device #A obtains the time domain resource set.

Optionally, the higher layer signaling may include a time domain offset and a detection periodicity of a candidate time domain resource for detecting. For example, if the detection periodicity is five slots and the time domain offset is one slot, the candidate time domain resource for detecting is slots {1, 6, 11, . . . }, and the time domain resource set may be any one of the slots {1, 6, 11, . . . }.

Optionally, the higher layer signaling may not only include the time domain offset and the detection periodicity for detecting the candidate time domain resource, but also may include the number of slots that appear in one detection periodicity. For example, if the detection periodicity is five slots, the time domain offset is one slot, and one detection periodicity includes two slots, time domain resources for detecting the candidate time domain resource are slots {1, 2, 6, 7, 11, 12, . . . }, and the time domain resource set is slots {1, 2}, slots {6, 7}, slots {11, 12}, or the like;

Optionally, the higher layer signaling not only includes the time domain offset and the detection periodicity for detecting the candidate time domain resource, but also includes a pattern of a slot that appears in a detection periodicity. For example, if the detection periodicity is five slots, the time domain offset is one slot, and slots {1, 3, 5} in five slots included in one detection periodicity are assigned, time domain resources for detecting the candidate time domain resource are slots {1, 3, 5, 6, 8, 10, 11, 13, 15, . . . }, and the time domain resource set is slots {1, 3, 5}, slots {6, 8, 10}, slots {11, 13, 15}, or the like.

Optionally, the higher layer signaling not only includes the time domain offset and the detection periodicity for detecting the candidate time domain resource, but also includes an assignment pattern of a mini slot that appears in a detection periodicity. For example, if the detection periodicity is five slots, the time domain offset is one slot, one slot includes seven mini slots, and the first three mini slots are assigned, time domain resources for detecting the candidate time domain resource are mini slots {0, 1, 2} in each slot in slots {1, 6, 11, . . . }, and the time domain resource set is mini slots {0, 1, 2} in a slot {1}, mini slots {0, 1, 2} in a slot {6}, mini slots {0, 1, 2} in a slot {11}, or the like.

Therefore, a part of a time domain interval in the time domain resource set is determined as the target time domain interval, thereby shortening a time domain interval for detecting the first resource indication information, further reducing power consumption and detection complexity of the terminal device, and improving scheduling flexibility.

In this embodiment of this application, the terminal device #A may determine the target time domain interval based on two cases (to be specific, the foregoing case 1 and case 2). The following separately describes specific processes in which the terminal device #A determines the target time domain interval based on the two cases.

Case 1 (the Uplink Signal #A is an Aperiodic Signal)

In case 1, to be specific, when the uplink signal #A is an aperiodic signal, the terminal device #A may determine, by using the resource indication information #2, that the terminal device #A sends the uplink signal #A on the time domain resource #2. Because the time domain resource #1 indicated by the detected resource indication information #1 at least partially overlaps the time domain resource #2, a proper and easy-to-implement manner for determining the target time domain interval may be as follows:

Optionally, the start moment of the target time domain interval is determined based on a time domain interval of the time domain resource #3 (which is an example of a third time domain resource) carrying the resource indication information #2, and the resource indication information #2 is used to indicate the time domain resource #2.

An end moment of the target time domain interval is determined based on the time domain interval of the time domain resource #2.

The following separately describes the start moment and the end moment of the target time domain interval. First, the start moment of the target time domain interval is described.

Optionally, the start moment of the target time domain interval is a start moment of the time domain interval of the time domain resource #3 or an end moment of the time domain interval of the time domain resource #3.

For example, if a resource carrying the resource indication information #2 is a symbol #0 and a symbol #1 in a slot #1, a time domain interval (denoted as a time domain interval #3 for ease of identification and understanding) of the time domain resource #3 is a time domain interval corresponding to the symbol #0 and the symbol #1 in the slot #1. A start moment of the time domain interval #3 is the symbol #0 in the slot #1, and an end moment of the time domain interval #3 is the symbol #1 in the slot #1. In this case, the start moment of the target time domain interval may be the symbol #0 or the symbol #1 in the slot #1.

In consideration of a processing time for the terminal device #A to demodulate and decode the resource indication information #2, this embodiment of this application further provides an optional implementation.

Optionally, the start moment of the target time domain interval is a moment of preset duration after the start moment of the time domain interval #3 or a moment of preset duration after the end moment of the time domain interval #3.

The preset duration may be predefined in a standard or pre-configured by the network device. Different preset duration may be predefined or pre-configured for different types of resource indication information #2. This is not limited in this embodiment of this application.

For example, if a resource carrying the resource indication information #2 is a symbol #0 and a symbol #1 in a slot #1, and the preset duration is four symbols, the time domain interval #3 is a time domain interval corresponding to the symbol #0 and the symbol #1 in the slot #1. The start moment of the time domain interval #3 is the symbol #0 in the slot #1, and the end moment of the time domain interval #3 is the symbol #1 in the slot #1. In this case, the start moment of the target time domain interval may be a symbol obtained by adding four symbols after the symbol #0 in the slot #1. In other words, the start moment of the target time domain interval is the fourth symbol after the symbol #0 in the slot #1. Alternatively, the end moment of the target time domain interval may be a symbol obtained by adding four symbols after the symbol #1 in the slot #1. In other words, the end moment of the target time domain interval is the fifth symbol after the symbol #1 in the slot #1.

Therefore, when the first uplink signal is an aperiodic signal, the terminal device may detect a candidate time domain resource possibly carrying the first resource indication information, based on the start moment of the target time domain interval in the time domain interval of the third time domain resource carrying the second resource indication information and from a time at which the network device starts to schedule the terminal device to send the first uplink signal. In this way, the terminal device can detect the first resource indication information as efficient as possible without wasting power.

Optionally, the end moment of the target time domain interval may be any one of the following:

a start moment of a time domain interval of the second time domain resource; and an end moment of the time domain interval of the second time domain resource.

For example, if the time domain interval (denoted as a time domain interval #2 for ease of identification and understanding) of the second time domain resource is a time domain interval corresponding to 14 symbols in a slot #2, the start moment of the time domain interval #2 is the first symbol (denoted as a symbol #0) in the slot #2, and the end moment of the time domain interval #2 is the fourteenth symbol (denoted as a symbol #13) in the slot #2. In this case, the start moment of the target time domain interval may be the symbol #0 or the symbol #13 in the slot #2.

Similarly, in consideration of a processing time for the terminal device #A to demodulate and decode the resource indication information #2, this embodiment of this application further provides an optional implementation.

Optionally, an end moment of the target time domain interval is any one of the following:

A moment of the preset duration before the start moment of the time domain interval of the second time domain resource; or a moment of preset duration before the end moment of the time domain interval of the second time domain resource.

The preset duration may be predefined in a standard or pre-configured by the network device. Different preset duration may be predefined or pre-configured for different types of resource indication information #2. This is not limited in this embodiment of this application.

Still using the example in which the time domain interval #2 is the time domain interval corresponding to the 14 symbols in the slot #2, if the preset duration is four symbols, the end moment of the target time domain interval is the fourth symbol before the symbol #0 in the slot #2, or the end moment of the target time domain interval is the fourth symbol before the symbol #13 in the slot #2, namely, a symbol #9 in the slot #2.

Case 2 (the Uplink Signal #A is a Periodic Signal)

In case 2, to be specific, when the uplink signal #A is a periodic signal, the target time domain interval is determined based on the time domain interval #2.

Optionally, the start moment of the target time domain interval is the start moment of the time domain interval #2.

In consideration of a processing time for the terminal device #A to demodulate and decode the resource indication information #2, this embodiment of this application further provides an optional implementation:

The start moment of the target time domain interval is a moment of preset duration before the start moment of the time domain interval #2.

For example, still using the example in which the time domain interval #2 is the time domain interval corresponding to the 14 symbols in the slot #2, the start moment of the target time domain interval may be the symbol #0 in the slot #2. Alternatively, if the preset duration is four symbols, the preset duration is the fourth symbol before the symbol #0 in the slot #2.

Therefore, the start moment of the target time domain interval is determined based on the time domain interval of the second time domain resource. When the first uplink signal is a periodic signal, the terminal device may detect a candidate time domain resource possibly carrying the first resource indication information, from a time at which the first uplink signal starts to be sent. In this way, the terminal device can detect the first resource indication information as efficient as possible without wasting power.

Optionally, the end moment of the target time domain interval may be any one of the following:

the start moment of the time domain interval #2;

the end moment of the time domain interval #2;

the moment of the preset duration before the start moment of the time domain interval #2; and a moment of preset duration before the end moment of the time domain interval #2.

For a description of the end moment of the target time domain interval, refer to the description of the end moment of the target time domain interval in case 1. Details are not described herein again.

Therefore, according to the information transmission method provided in this embodiment of this application, by detecting the at least one candidate time domain resource in the target time domain interval, the terminal device may prohibit, based on the first resource indication information that is detected on the first candidate time domain resource and that is used to indicate the first time domain resource, sending of at least a part of the uplink signal carried on the second time domain resource, where the second time domain resource at least partially overlaps the first time domain resource. In this way, inter-signal interference caused due to simultaneous transmission of uplink signals in an overlapped area between the first time domain resource and the second time domain resource is avoided, and especially timely transmission of a URLLC service carried on the first time domain resource is ensured, thereby improving overall signal transmission performance.

In addition, the terminal device determines a part of a time domain interval in the time domain resource set as the target time domain interval, thereby shortening a time domain interval for detecting the first resource indication information, further reducing power consumption and detection complexity of the terminal device, and improving scheduling flexibility.

Moreover, when the first uplink signal is an aperiodic signal, the terminal device may detect a candidate time domain resource possibly carrying the first resource indication information, based on the start moment of the target time domain interval in the time domain interval of the third time domain resource carrying the second resource indication information and from a time at which the network device starts to schedule the terminal device to send the first uplink signal. In this way, the terminal device can detect the first resource indication information as efficient as possible without wasting power.

Further, the start moment of the target time domain interval is determined based on the time domain interval of the second time domain resource. When the first uplink signal is a periodic signal, the terminal device may detect a candidate time domain resource possibly carrying the first resource indication information, from a time at which the first uplink signal starts to be sent. In this way, the terminal device can detect the first resource indication information as efficient as possible without wasting power.

The foregoing describes the information transmission method 100 in this embodiment of this application with reference to FIG. 2 to FIG. 4. The following describes an information transmission method 200 in another embodiment of this application with reference to FIG. 5.

Figure 5:
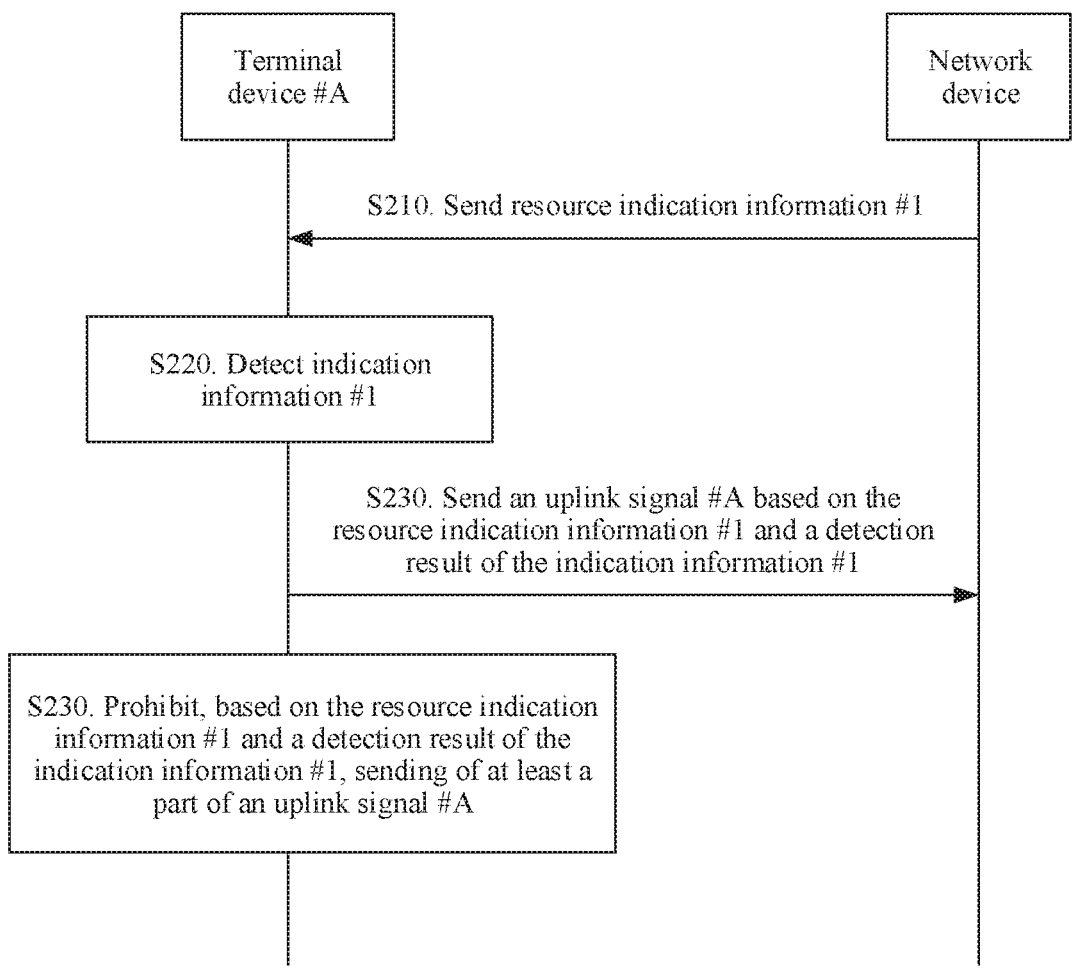
FIG. 5 is a schematic interaction diagram of an information transmission method according to another embodiment of this application.

FIG. 5 is a schematic interaction diagram of the information transmission method 200 according to another embodiment of this application. Each step of the method 200 is described in detail below.

Similarly, in the method 200, a terminal device supporting an eMBB service is denoted as a terminal device #A.

Before step S210, the terminal device #A may determine a time domain resource (denoted as a time domain resource #2 for ease of identification and understanding) by using RRC signaling sent by a network device. The time domain resource #2 is used to carry a first uplink signal (denoted as an uplink signal #A for ease of identification and understanding). The uplink signal #A may correspond to data or information of the eMBB service.

Optionally, the uplink signal #A may be a periodic signal. The uplink signal #A may be any one of the following:
 a signal carried on a grant-free uplink data channel;
 a signal carried on a semi-persistent scheduling uplink data channel;
 a periodic sounding reference signal SRS;
 periodic channel state information CSI; and
 a periodic random access signal.

For a description of the uplink signal #A being a periodic signal in the method 200, refer to the description of the uplink signal #A being a periodic signal in the method 100. For brevity, details are not described herein again.

In addition, for a description of the time domain resource #2 in the method 200, refer to the description of the time domain resource #2 in the method 100. For brevity, details are not described herein again.

In S210, the network device sends resource indication information #1 (which is an example of first resource indication information) to the terminal device #A, where the resource indication information #1 is used to indicate a time domain resource #1 (which is an example of a first time domain resource), and the time domain resource #1 at least partially overlaps a time domain resource #2.

Therefore, the terminal device #A receives the resource indication information #1 sent by the network device.

An explanation of the resource indication information #1 is the same as that of the resource indication information #1 in the method 100. For a description of step S210, refer to the related description of step S110 in the method 100. Details are not described herein again.

Optionally, the resource indication information #1 may be uplink grant information #1 (which is an example of first uplink grant information) for the terminal device #A.

In S220, the terminal device #A detects indication information #1 (which is an example of first indication information), where the indication information #1 is used to indicate a transmission attribute of the time domain resource #1.

The transmission attribute of the time domain resource #1 may include any one of the following: a transmission direction of the time domain resource #1, whether the time domain resource #1 is available for transmission, interference intensity of the time domain resource #1, signal strength of the time domain resource #1, and a modulation and coding scheme of the time domain resource #1.

In S230, the terminal device #A sends the uplink signal #A based on the resource indication information #1 and a detection result of the indication information #1; or prohibits, based on the resource indication information #1 and a detection result of the indication information #1, sending of at least a part of the uplink signal #A.

In other words, the terminal device #A sends the uplink signal #A based on the resource indication information #1 and the detection result of the indication information #1; or skips, based on the resource indication information #1 and the detection result of the indication information #1, sending at least a part of the uplink signal #A.

To be specific, after detecting the resource indication information #1, the terminal device #A not only determines, by using the resource indication information #1, whether to send at least a part of the uplink signal #A, but also determines, by using the detection result of the indication information #1, whether to send the uplink signal #A.

It should be noted that in this application embodiment, only the case in which the terminal device #A has detected the resource indicator information #1 is considered.

Actually, if the time domain resource #1 occupies a part of system bandwidth, although there is an overlapped area between the time domain resource #1 and the time domain resource #2, for example, in a frequency division multiplexing system, the time domain resource #1 and the time domain resource #2 may be orthogonal. Signals are separately sent on the time domain resource #1 and the time domain resource #2 in a frequency division manner. Therefore, normal transmission of signals does not affect each other.

Therefore, according to the information transmission method provided in this embodiment of this application, the terminal device not only can determine, based on the first resource indication information used to indicate the first time domain resource, whether to send at least a part of the first uplink signal carried on a second time domain resource, but also can determine, based on the detection result of the first indication information used to indicate the transmission attribute of the first time domain resource, whether to send at least a part of the first uplink signal. In this way, timely transmission of an uplink signal carried on the first time domain resource is ensured, and timely transmission of the first uplink signal carried on the second time domain resource can also be ensured as much as possible, thereby improving overall signal transmission reliability, and improving system scheduling flexibility. Especially, when there is an overlapped area between the first time domain resource and the second time domain resource but uplink signals may be separately sent in a frequency division multiplexing manner, this embodiment of this application has good applicability.

Optionally, the indication information #1 includes slot format information, the slot format information is used to indicate a transmission direction of the time domain resource #1, and the transmission direction is an uplink transmission direction or a non-uplink transmission direction.

The non-uplink transmission direction includes a downlink transmission direction or a flexible transmission direction. The flexible transmission direction indicates an uplink transmission direction or a downlink transmission direction that may be determined based on an actual situation during subsequent use. However, the flexible transmission direction cannot be currently determined as an uplink transmission direction or a downlink transmission direction.

In the following, when the indication information #1 includes the slot format information, two cases (namely, case A and case B) are used to describe in detail a specific process in which the terminal device #A sends the uplink signal #A based on the resource indication information #1 and the detection result of the slot format information; or prohibits, based on the resource indication information #1 and the detection result of the slot format information, sending of at least a part of the uplink signal #A.

Case A

If the terminal device #A fails to detect the slot format information, the terminal device prohibits sending of at least a part of the uplink signal #A;

if the terminal device #A detects the slot format information and the slot format information indicates that the transmission direction of the time domain resource #1 is a non-uplink transmission direction, the terminal device #A prohibits sending of at least a part of the uplink signal #A; or if the terminal device #A detects the slot format information and the slot format information indicates that the transmission direction of the time domain resource #1 is an uplink transmission direction, the terminal device #A sends the uplink signal #A.

In other words, if the terminal device #A fails to detect the slot format information, the terminal device does not send at least a part of the uplink signal #A;

if the terminal device #A detects the slot format information and the slot format information indicates that the transmission direction of the time domain resource #1 is a non-uplink transmission direction, the terminal device #A does not send at least a part of the uplink signal #A; or if the terminal device #A detects the slot format information and the slot format information indicates that the transmission direction of the time domain resource #1 is an uplink transmission direction, the terminal device #A sends the uplink signal #A. In case A, for the network device, the network device may send or not send the slot format information based on different scenarios.

Case A1 (the Network Device does not Send the Time Slot Format Information)

If the network device determines that an uplink signal cannot be separately sent on the time domain resource #1 and the time domain resource #2 in a frequency division multiplexing manner, the network device does not send the slot format information. In this case, even if the terminal device #A detects the resource indication information #1, the terminal device #A may further determine, when the slot format information is not detected, that the uplink signal cannot be separately sent on the time domain resource #1 and the time domain resource #2 in a frequency division multiplexing manner, and therefore prohibits sending of at least a part of the uplink signal #A. Correspondingly, the network device does not detect at least the part of the uplink signal #A on at least a part of the time domain resource #1.

Specifically, provided that there is an overlapped area between the time domain resource #1 and the time domain resource #2, the terminal device #A does not send the uplink signal #A on the time domain resource #2. Correspondingly, if the network device determines that the uplink signal #A does not exist on the time domain resource #1, the network device does not detect the uplink signal #A on the time domain resource #1. Alternatively, if the time domain resource #2 partially overlaps the time domain resource 1, the terminal device #A prohibits sending of an uplink signal in the uplink signal #A carried in the overlapped area in the time domain resource #2, and may send a remaining part of the uplink signal #A outside the overlapped area in the time domain resource #2. Correspondingly, if the network device determines that a part of the uplink signal #A does not exist in the overlapped area, the network device does not receive the part of the uplink signal #A (that is, an uplink signal carried in the overlapped area) in the overlapped area, and may receive the remaining part of the uplink signal #A outside the overlapped area in the time domain resource #2.

Case A2 (the Network Device Sends the Time Slot Format Information)

In some scenarios (for example, the network device broadcasts the slot format information to a plurality of terminal devices including the terminal device #A), the network device needs to send the slot format information.

If the network device determines that the uplink signal cannot be separately sent on the time domain resource #1 and the time domain resource #2 in a frequency division multiplexing manner, the slot format information indicates that the transmission direction of the time domain resource #1 is a non-uplink transmission direction. In this case, even if the terminal device #A detects the resource indication information #1, the terminal device #A further determines, based on the transmission direction of the time domain resource #1 indicated by the slot format information, that sending of at least a part of the uplink signal #A may be prohibited.

For a specific description of prohibiting, by the terminal device #A, sending of at least a part of the uplink signal #A, refer to the foregoing description. Similarly, for a corresponding specific description of prohibiting, by the network device, detection of at least the part of the uplink signal #A on at least a part of the time domain resource #1, refer to the foregoing description. For brevity, details are not described herein again.

If the network device determines that the uplink signal may be separately sent on the time domain resource #1 and the time domain resource #2 in a frequency division multiplexing manner, the slot format information indicates that the transmission direction of the time domain resource #1 is an uplink transmission direction. In this case, even if the terminal device #A detects the resource indication information #1, the terminal device #A does not prohibit sending of at least a part of the uplink signal #A, but further determines, based on the transmission direction of the time domain resource #1 indicated by the slot format information, that the uplink signal #A may be sent.

Optionally, if the terminal device #A detects the slot format information, the slot format information indicates that the transmission direction of the time domain resource #1 is an uplink transmission direction, and a time domain resource carrying the slot format information is not earlier than a time domain resource carrying the resource indication information #1, the terminal device #A sends the uplink signal #A.

Specifically, if the network device determines that the uplink signal may be separately sent on the time domain resource #1 and the time domain resource #2 in a frequency division multiplexing manner, the network device sends the slot format information at a moment not earlier than a transmission moment of the resource indication information #1, and the slot format information indicates that the transmission direction of the time domain resource #1 is an uplink transmission direction. In this case, even if the terminal device #A detects the resource indication information #1, the terminal device #A does not prohibit sending of at least a part of the uplink signal #A, but further determines, based on the transmission direction of the time domain resource #1 indicated by the slot format information, that the uplink signal #A may be sent.

In other words, if the time domain resource carrying the slot format information is earlier than the time domain resource carrying the resource indication information #1, even if the slot format information indicates that the transmission direction of the first time domain resource is an uplink transmission direction, the terminal device #A prohibits sending of at least a part of the uplink signal #A.

Case B

If the terminal device #A fails to detect the slot format information, the terminal device sends the uplink signal #A;

if the terminal device #A detects the slot format information and the slot format information indicates that the transmission direction of the time domain resource #1 is an uplink transmission direction, the terminal device sends the uplink signal #A; or if the terminal device #A detects the slot format information and the slot format information indicates that the transmission direction of the time domain resource #1 is a non-uplink transmission direction, the terminal device #A prohibits sending of at least a part of the uplink signal #A.

In other words, if the terminal device #A fails to detect the slot format information, the terminal device sends the uplink signal #A;

if the terminal device #A detects the slot format information and the slot format information indicates that the transmission direction of the time domain resource #1 is an uplink transmission direction, the terminal device sends the uplink signal #A; or if the terminal device #A detects the slot format information and the slot format information indicates that the transmission direction of the time domain resource #1 is a non-uplink transmission direction, the terminal device #A does not send at least a part of the uplink signal #A.

In case B, similarly, for the network device, the network device may also send or not send the slot format information based on different scenarios.

Case B1 (the Network Device does not Send the Time Slot Format Information)

If the network device determines that the uplink signal may be separately sent on the time domain resource #1 and the time domain resource #2 in a frequency division multiplexing manner, the network device does not send the slot format information. In this case, even if the terminal device #A detects the resource indication information #1, the terminal device #A does not prohibit sending of at least a part of the uplink signal #A, but further may determine, when the slot format information is not detected, that the uplink signal may be separately sent on the time domain resource #1 and the time domain resource #2 in a frequency division multiplexing manner, and therefore determines that the uplink signal #A may be sent.

Case B2 (the Network Device Sends the Time Slot Format Information)

In some scenarios (for example, the network device needs to broadcast the slot format information to a plurality of terminal devices including the terminal device #A), the network device needs to send the slot format information.

If the network device determines that the uplink signal may be separately sent on the time domain resource #1 and the time domain resource #2 in a frequency division multiplexing manner, the slot format information indicates that the transmission direction of the time domain resource #1 is an uplink transmission direction. In this case, even if the terminal device #A detects the resource indication information #1, the terminal device #A does not prohibit sending of at least a part of the uplink signal #A either, but further determines, based on the transmission direction of the time domain resource #1 indicated by the slot format information, that the uplink signal #A may be sent.

Optionally, if the terminal device #A detects the slot format information, the slot format information indicates that the transmission direction of the time domain resource #1 is an uplink transmission direction, and a time domain resource carrying the slot format information is not earlier than a time domain resource carrying the resource indication information #1, the terminal device #A sends the uplink signal #A.

Specifically, if the network device determines that the uplink signal may be separately sent on the time domain resource #1 and the time domain resource #2 in a frequency division multiplexing manner, the network device sends the slot format information at a moment not earlier than a transmission moment of the resource indication information #1, and the slot format information indicates that the transmission direction of the time domain resource #1 is an uplink transmission direction. In this case, even if the terminal device #A detects the resource indication information #1, the terminal device #A does not prohibit sending of at least a part of the uplink signal #A, but further determines, based on the transmission direction of the time domain resource #1 indicated by the slot format information, that the uplink signal #A may be sent.

In other words, if the time domain resource carrying the slot format information is earlier than the time domain resource carrying the resource indication information #1, even if the slot format information indicates that the transmission direction of the first time domain resource is an uplink transmission direction, the terminal device #A prohibits sending of at least a part of the uplink signal #A.

If the network device determines that the uplink signal cannot be separately sent on the time domain resource #1 and the time domain resource #2 in a frequency division multiplexing manner, the slot format information indicates that the transmission direction of the time domain resource #1 is a non-uplink transmission direction. In this case, even if the terminal device #A detects the resource indication information #1, the terminal device #A further determines, based on the transmission direction of the time domain resource #1 indicated by the slot format information, to prohibit sending of the uplink signal #A. For a specific description of prohibiting, by the terminal device #A, sending of at least a part of the uplink signal #A, refer to the foregoing description. Similarly, for a corresponding specific description of prohibiting, by the network device, detection of at least the part of the uplink signal #A on at least a part of the time domain resource #1, refer to the foregoing description. For brevity, details are not described herein again.

The foregoing description of determining, by the terminal device #A based on the resource indication information #1 and the detection result of the indication information #1, whether to send at least a part of the uplink signal #A is merely an example. This embodiment of this application is not limited thereto.

For example, the indication information #1 may further include information used to indicate the interference intensity, the signal strength, and the modulation and coding scheme of the time domain resource #1. A specific implementation process is as follows:

If the terminal device #A does not detect the indication information #1, the terminal device #A prohibits sending of at least a part of the uplink signal #A;

if the terminal device #A detects the indication information #1 and the indication information #1 indicates that the transmission attribute of the time domain resource #1 is a first attribute, the terminal device #A prohibits sending of at least apart of the uplink signal #A; or if the terminal device #A detects the indication information #1 and the indication information #1 indicates that the transmission attribute of the time domain resource #1 is a second attribute, the terminal device #A sends the uplink signal #A.

In other words, if the terminal device #A does not detect the indication information #1, the terminal device #A does not send at least a part of the uplink signal #A;

if the terminal device #A detects the indication information #1 and the indication information #1 indicates that the transmission attribute of the time domain resource #1 is the first attribute, the terminal device #A does not send at least a part of the uplink signal #A; or if the terminal device #A detects the indication information #1 and the indication information #1 indicates that the transmission attribute of the time domain resource #1 is the second attribute, the terminal device #A sends the uplink signal #A.

The transmission attribute of the time domain resource #1 includes at least one of the interference intensity, the signal strength, and the modulation and coding scheme of the time domain resource #1.

If the transmission attribute of the time domain resource #1 includes the interference intensity of the time domain resource #1, the first attribute indicates that the interference intensity of the time domain resource #1 is greater than or equal to a first threshold, and the second attribute indicates that the interference intensity of the time domain resource #1 is less than the first threshold.

If the transmission attribute of the time domain resource #1 includes the signal strength of the time domain resource #1, the first attribute indicates that the signal strength of the time domain resource #1 is greater than or equal to a second threshold, and the second attribute indicates that the signal strength of the time domain resource #1 is less than the second threshold.

If the transmission attribute of the time domain resource #1 includes the modulation and coding scheme of the time domain resource #1, the first attribute indicates a first modulation and coding scheme, and the second attribute indicates a second modulation and coding scheme, where a modulation order (for example, 64QAM) corresponding to the first modulation and coding scheme is higher than a modulation order (for example, QPSK) corresponding to the second modulation and coding scheme; and/or a coding rate corresponding to the first modulation and coding scheme is higher than a coding rate corresponding to the second modulation and coding scheme.

Therefore, according to the information transmission method provided in this embodiment of this application, the terminal device not only can determine, based on the first resource indication information used to indicate the first time domain resource, whether to send at least a part of the first uplink signal carried on the second time domain resource, but also can determine, based on the detection result of the first indication information used to indicate the transmission attribute of the first time domain resource, whether to send at least a part of the first uplink signal. In this way, timely transmission of an uplink signal carried on the first time domain resource is ensured, and timely transmission of the first uplink signal carried on the second time domain resource can also be ensured as much as possible, thereby improving overall signal transmission reliability, and improving system scheduling flexibility. Especially, when there is an overlapped area between the first time domain resource and the second time domain resource but uplink signals may be separately sent in a frequency division multiplexing manner, this embodiment of this application has good applicability.

The foregoing describes the information transmission methods according to the embodiments of this application in detail with reference to FIG. 1 to FIG. 5. The following describes information transmission apparatuses according to the embodiments of this application with reference to FIG. 6 to FIG. 10. The technical features described in the method embodiments are also applicable to the following apparatus embodiments.

Figure 6:
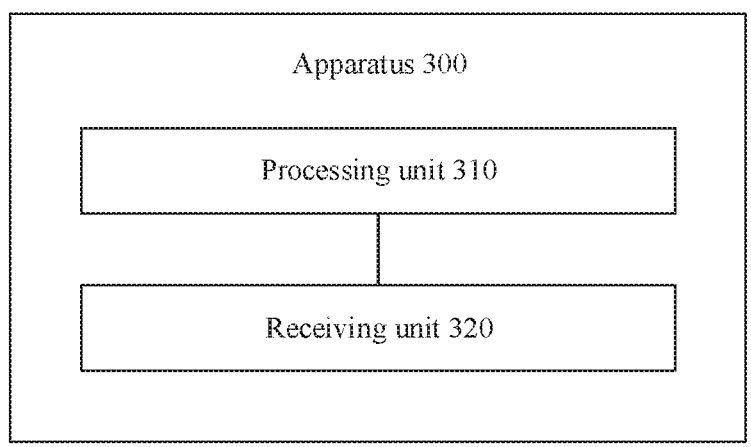
FIG. 6 to FIG. 10 are schematic block diagrams of an information transmission apparatus according to an embodiment of this application.

FIG. 6 is a schematic block diagram of a data transmission apparatus 300 according to an embodiment of this application. As shown in FIG. 6, the apparatus 300 includes:

a processing unit 310, configured to determine a target time domain interval, where a time domain resource in the target time domain interval includes at least one candidate time domain resource; and a receiving unit 320, configured to receive first resource indication information on a first candidate time domain resource in the at least one candidate time domain resource, where the first resource indication information is used to indicate a first time domain resource, the first time domain resource at least partially overlaps a second time domain resource, and the second time domain resource is used to carry a first uplink signal.

The processing unit 310 is further configured to prohibit, based on the first resource indication information, sending of at least a part of the first uplink signal.

Therefore, according to the information transmission apparatus provided in this embodiment of this application, by detecting the at least one candidate time domain resource in the target time domain interval, the apparatus may prohibit, based on the first resource indication information that is detected on the first candidate time domain resource and that is used to indicate the first time domain resource, sending of at least a part of the uplink signal carried on the second time domain resource, where the second time domain resource at least partially overlaps the first time domain resource. In this way, inter-signal interference caused due to simultaneous transmission of uplink signals in an overlapped area between the first time domain resource and the second time domain resource is avoided, and especially, timely transmission of a URLLC service carried on the first time domain resource is ensured, thereby improving overall signal transmission performance.

That the first time domain resource at least partially overlaps the second time domain resource includes at least one of the following:

the first time domain resource belongs to the second time domain resource, in other words, the second time domain resource includes the first time domain resource;

the first time domain resource partially overlaps the second time domain resource;

the second time domain resource belongs to the first time domain resource, in other words, the first time domain resource includes the second time domain resource; and the first time domain resource completely overlaps the second time domain resource.

Optionally, the time domain resource in the target time domain interval belongs to a time domain resource set that is pre-configured; and the processing unit 310 is further configured to:

prohibit detection of the first resource indication information on at least one candidate time domain resource in the time domain resource set outside the target time domain interval.

Therefore, according to the information transmission apparatus provided in this embodiment of this application, the apparatus determines a part of a time domain interval in the time domain resource set as the target time domain interval, thereby shortening a time domain interval for detecting the first resource indication information, further reducing power consumption and detection complexity of the apparatus, and improving scheduling flexibility.

Optionally, a start moment of the target time domain interval is determined based on a time domain interval of a third time domain resource carrying second resource indication information, and the second resource indication information is used to indicate the second time domain resource.

Therefore, according to the information transmission apparatus provided in this embodiment of this application, when the first uplink signal is an aperiodic signal, the apparatus may detect a candidate time domain resource possibly carrying the first resource indication information, based on the start moment of the target time domain interval in the time domain interval of the third time domain resource carrying the second resource indication information and from a time at which a network device starts to schedule the apparatus to send the first uplink signal. In this way, the apparatus can detect the first resource indication information as efficient as possible without wasting power.

Optionally, the start moment of the target time domain interval is any one of the following:

a start moment of the time domain interval of the third time domain resource;

an end moment of the time domain interval of the third time domain resource;

a moment of preset duration after the start moment of the time domain interval of the third time domain resource; and a moment of preset duration after the end moment of the time domain interval of the third time domain resource.

Optionally, a start moment of the target time domain interval is determined based on a time domain interval of the second time domain resource.

Therefore, according to the information transmission apparatus provided in this embodiment of this application, the start moment of the target time domain interval is determined based on the time domain interval of the second time domain resource. When the first uplink signal is a periodic signal, the apparatus may detect a candidate time domain resource possibly carrying the first resource indication information, from a time at which the first uplink signal starts to be sent. In this way, the apparatus can detect the first resource indication information as efficient as possible without wasting power.

Optionally, the start moment of the target time domain interval is any one of the following:

a start moment of the time domain interval of the second time domain resource; and a moment of preset duration before the start moment of the time domain interval of the second time domain resource.

Optionally, an end moment of the target time domain interval is any one of the following:

the start moment of the time domain interval of the second time domain resource;

an end moment of the time domain interval of the second time domain resource;

the moment of the preset duration before the start moment of the time domain interval of the second time domain resource; and a moment of preset duration before the end moment of the time domain interval of the second time domain resource.

Optionally, the time domain resource in the target time domain interval belongs to a time domain resource set that is pre-configured; and the receiving unit 320 is further configured to:

detect the first resource indication information in the target time domain interval by using first-type time domain configuration information; and detect second resource indication information on at least one candidate time domain resource in the time domain resource set outside the target time domain interval by using second-type time domain configuration information, where the second resource indication information is used to indicate the second time domain resource, and a periodicity or duration corresponding to the first-type time domain configuration information is less than a periodicity or duration corresponding to the second-type time domain configuration information.

Optionally, the first resource indication information is first uplink grant information.

Optionally, the second time-frequency resource is carried in the second resource indication information, and the second resource indication information is second uplink grant information.

The information transmission apparatus 300 may correspond to the terminal device described in the method 100

(for example, may be configured as the terminal device or may be the terminal device), and modules or units in the information transmission apparatus 300 are separately configured to perform actions or processing processes performed by the terminal device in the method 100. To avoid repetition, details are not described herein again.

In this embodiment of this application, the apparatus 300 may be a terminal device. The terminal device may include a processor, a transmitter, and a receiver. The processor, the transmitter, and the receiver are communicatively connected. Optionally, the terminal device further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the processing unit 310 in the apparatus 300 shown in FIG. 6 may correspond to the processor of the terminal device.

The receiving unit 320 in the apparatus 300 shown in FIG. 6 may correspond to the receiver of the terminal device.

In this embodiment of this application, the apparatus 300 may be a chip (or a chip system) installed in a terminal device. In this case, the apparatus 300 may include a processor and an input/output interface. The processor may be communicatively connected to a transceiver of the terminal device through the input/output interface. Optionally, the apparatus further includes a memory, and the memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

Figure 7:
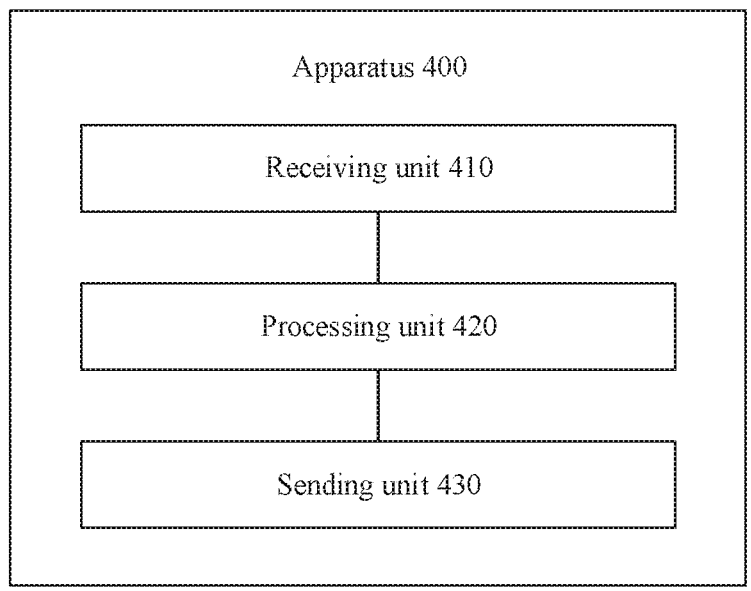

In this case, the receiving unit in the apparatus 300 shown in FIG. 6 may correspond to the input interface, and a sending unit in an apparatus 400 shown in FIG. 7 may correspond to the output interface.

In this case, the processing unit 310 in the apparatus 300 shown in FIG. 6 may correspond to the processor, and the receiving unit 320 in the apparatus 300 shown in FIG. 6 may correspond to the input interface.

FIG. 7 is a schematic block diagram of a data transmission apparatus 400 according to an embodiment of this application. As shown in FIG. 7, the apparatus 400 includes:

a receiving unit 410, configured to receive first resource indication information, where the first resource indication information is used to indicate a first time domain resource, the first time domain resource at least partially overlaps a second time domain resource, and the second time domain resource is used to carry a first uplink signal, where the receiving unit 410 is further configured to detect first indication information, where the first indication information is used to indicate a transmission attribute of the first time domain resource; and a processing unit 420 and a sending unit 430, where the processing unit 420 is configured to:

control, based on the first resource indication information and a detection result of the first indication information, the sending unit 430 to send the first uplink signal; or prohibit, based on the first resource indication information and a detection result of the first indication information, sending of at least a part of the first uplink signal.

Therefore, according to the information transmission apparatus provided in this embodiment of this application, the apparatus not only can determine, based on the first resource indication information used to indicate the first time domain resource, whether to send at least a part of the first uplink signal carried on the second time domain resource, but also can determine, based on the detection result of the first indication information used to indicate the transmission attribute of the first time domain resource, whether to send at least a part of the first uplink signal. In this way, timely transmission of an uplink signal carried on the first time domain resource is ensured, and timely transmission of the first uplink signal carried on the second time domain resource can also be ensured as much as possible, thereby improving overall signal transmission reliability, and improving system scheduling flexibility. Especially, when there is an overlapped area between the first time domain resource and the second time domain resource but uplink signals may be separately sent in a frequency division multiplexing manner, this embodiment of this application has good applicability.

That the first time domain resource at least partially overlaps the second time domain resource includes at least one of the following:

the first time domain resource belongs to the second time domain resource, in other words, the second time domain resource includes the first time domain resource;

the first time domain resource partially overlaps the second time domain resource;

the second time domain resource belongs to the first time domain resource, in other words, the first time domain resource includes the second time domain resource; and the first time domain resource completely overlaps the second time domain resource.

Optionally, the transmission attribute of the first time domain resource includes any one of the following: a transmission direction of the first time domain resource, whether the first time domain resource can be used for transmission, interference intensity of the first time domain resource, signal strength of the first time domain resource, and a modulation and coding scheme of the first time domain resource.

Optionally, the first indication information includes slot format information, the slot format information is used to indicate a transmission direction of the first time domain resource, and the transmission direction is an uplink transmission direction or a non-uplink transmission direction.

Optionally, the processing unit 420 is specifically configured to:

if the receiving unit 410 fails to detect the slot format information, prohibit sending of at least the part of the first uplink signal;

if the receiving unit 410 detects the slot format information and the slot format information indicates that the transmission direction of the first time domain resource is a non-uplink transmission direction, prohibit sending of at least the part of the first uplink signal; or if the receiving unit 410 detects the slot format information and the slot format information indicates that the transmission direction of the first time domain resource is an uplink transmission direction, control the sending unit 430 to send the first uplink signal.

Optionally, the processing unit 420 is specifically configured to:

if the receiving unit 410 detects the slot format information, the slot format information indicates that a transmission direction of the first time domain resource is an uplink transmission direction, and a time domain resource carrying the slot format information is not earlier than a time domain resource carrying the first resource indication information, control the sending unit 430 to send the first uplink signal.

Optionally, the processing unit 420 is specifically configured to:

if the receiving unit 410 fails to detect the slot format information, control the sending unit 430 to send the first uplink signal;

if the receiving unit 410 detects the slot format information and the slot format information indicates that the transmission direction of the first time domain resource is an uplink transmission direction, control the sending unit 430 to send the first uplink signal; or if the receiving unit 410 detects the slot format information and the slot format information indicates that the transmission direction of the first time domain resource is a non-uplink transmission direction, prohibit sending of at least the part of the first uplink signal.

Optionally, the first uplink signal is any one of the following:

a signal carried on a grant-free uplink data channel;

a signal carried on a semi-persistent scheduling uplink data channel;

a periodic sounding reference signal SRS;

periodic channel state information CSI; and a periodic random access signal.

Optionally, the first resource indication information is first uplink grant information.

The information transmission apparatus 400 may correspond to the terminal device described in the method 200 (for example, may be configured as the terminal device or may be the terminal device), and modules or units in the information transmission apparatus 400 are separately configured to perform actions or processing processes performed by the terminal device in the method 200. To avoid repetition, details are not described herein again.

In this embodiment of this application, the apparatus 400 may be a terminal device. The terminal device may include a processor, a transmitter, and a receiver. The processor, the transmitter, and the receiver are communicatively connected. Optionally, the terminal device further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the receiving unit 410 in the apparatus 40*o* shown in FIG. 7 may correspond to the receiver of the terminal device, The processing unit 420 shown in FIG. 7 may correspond to the processor of the terminal device, and the sending unit 430 shown in FIG. 7 may correspond to the transmitter of the terminal device. In another implementation, the transmitter and the receiver may be implemented by a same component, to be specific, a transceiver.

In this embodiment of this application, the apparatus 400 may be a chip (or a chip system) installed in a terminal device. In this case, the apparatus 400 may include a processor and an input/output interface. The processor may be communicatively connected to a transceiver of the terminal device through the input/output interface. Optionally, the apparatus further includes a memory, and the memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

In this case, the receiving unit 410 in the apparatus 40*o* shown in FIG. 7 may correspond to the input interface, the processing unit 420 shown in FIG. 7 may correspond to the processor, and the sending unit 430 shown in FIG. 7 may correspond to the output interface.

Figure 8:
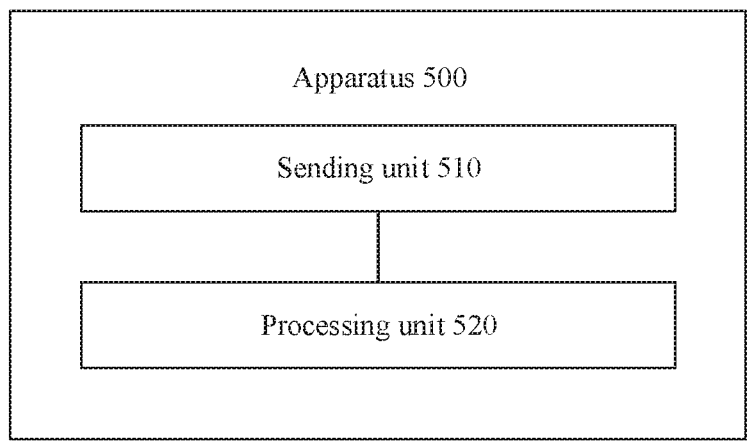

FIG. 8 is a schematic block diagram of a data transmission apparatus 500 according to an embodiment of this application. As shown in FIG. 8, the apparatus 500 includes:

a sending unit 510, configured to send first resource indication information on a first candidate time domain resource in a target time domain interval, where the first candidate time domain resource belongs to at least one candidate time domain resource in the target time domain interval, the first resource indication information is used to indicate a first time domain resource, the first time domain resource at least partially overlaps a second time domain resource, and the second time domain resource is used to carry a first uplink signal; and a processing unit 520, configured to prohibit detection of at least a part of the first uplink signal on at least a part of the first time domain resource.

That the first time domain resource at least partially overlaps the second time domain resource includes at least one of the following:

the first time domain resource belongs to the second time domain resource, in other words, the second time domain resource includes the first time domain resource;

the first time domain resource partially overlaps the second time domain resource;

the second time domain resource belongs to the first time domain resource, in other words, the first time domain resource includes the second time domain resource; and the first time domain resource completely overlaps the second time domain resource.

Optionally, a time domain resource in the target time domain interval belongs to a time domain resource set that is pre-configured; and the processing unit 520 is further configured to:

prohibit sending of the first resource indication information on at least one candidate time domain resource in the time domain resource set outside the target time domain interval.

Optionally, a start moment of the target time domain interval is determined based on a time domain interval of a third time domain resource carrying second resource indication information, and the second resource indication information is used to indicate the second time domain resource.

Optionally, the start moment of the target time domain interval is any one of the following:

a start moment of the time domain interval of the third time domain resource;

an end moment of the time domain interval of the third time domain resource;

a moment of preset duration after the start moment of the time domain interval of the third time domain resource; and a moment of preset duration after the end moment of the time domain interval of the third time domain resource.

Optionally, a start moment of the target time domain interval is determined based on a time domain interval of the second time domain resource.

Optionally, the start moment of the target time domain interval is any one of the following:

a start moment of the time domain interval of the second time domain resource; and a moment of preset duration before the start moment of the time domain interval of the second time domain resource.

Optionally, an end moment of the target time domain interval is any one of the following:

the start moment of the time domain interval of the second time domain resource;

an end moment of the time domain interval of the second time domain resource;

the moment of the preset duration before the start moment of the time domain interval of the second time domain resource; and a moment of preset duration before the end moment of the time domain interval of the second time domain resource.

Optionally, a time domain resource in the target time domain interval belongs to a time domain resource set that is pre-configured;

the processing unit 520 is further configured to:

prohibit sending of the first resource indication information in the target time domain interval by using first-type time domain configuration information; and the sending unit 510 is further configured to:

send second resource indication information on at least one candidate time domain resource in the time domain resource set outside the target time domain interval by using second-type time domain configuration information, where the second resource indication information is used to indicate the second time domain resource, and a periodicity or duration corresponding to the first-type time domain configuration information is less than a periodicity or duration corresponding to the second-type time domain configuration information.

Optionally, the first resource indication information is first uplink grant information.

Optionally, the second time-frequency resource is carried in the second resource indication information, and the second resource indication information is second uplink grant information.

The information transmission apparatus 500 may correspond to the network device described in the method 100 (for example, may be configured as the network device or may be the network device), and modules or units in the information transmission apparatus 500 are separately configured to perform actions or processing processes performed by the network device in the method 100. To avoid repetition, details are not described herein again.

In this embodiment of this application, the apparatus 500 may be a network device. The network device may include a processor, a transmitter, and a receiver. The processor, the transmitter, and the receiver are communicatively connected. Optionally, the network device further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the sending unit 510 shown in FIG. 8 may correspond to the transmitter of the network device, and the processing unit 520 shown in FIG. 8 may correspond to the processor of the network device.

In this embodiment of this application, the apparatus 500 may be a chip (or a chip system) installed in a network device. In this case, the apparatus 500 may include a processor and an input/output interface. The processor may be communicatively connected to a transceiver of the network device through the input/output interface. Optionally, the apparatus further includes a memory, and the memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

In this case, the sending unit 510 in the apparatus 500 shown in FIG. 8 may correspond to the output interface, and the processing unit 520 shown in FIG. 8 may correspond to the processor.

Figure 9:
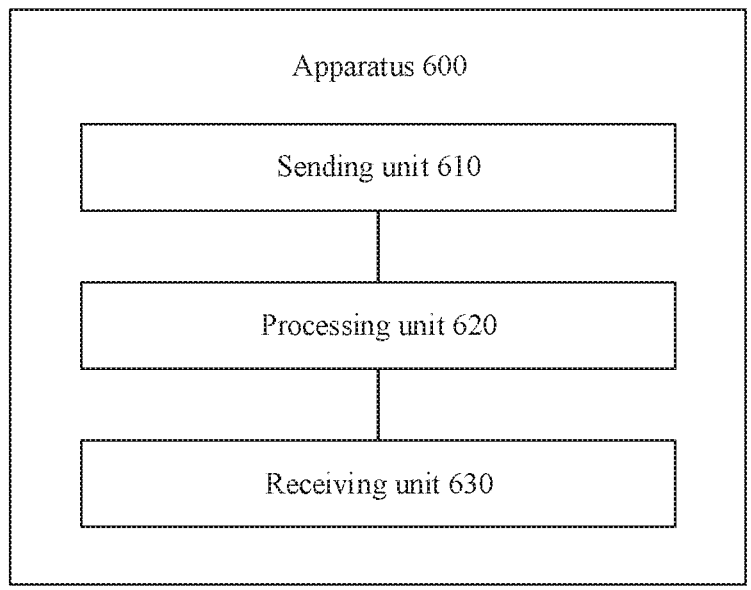

FIG. 9 is a schematic block diagram of a data transmission apparatus 600 according to an embodiment of this application. As shown in FIG. 9, the apparatus 600 includes:

a sending unit 610, configured to send first resource indication information, where the first resource indication information is used to indicate a first time domain resource, the first time domain resource at least partially overlaps a second time domain resource, and the second time domain resource is used to carry a first uplink signal; and a processing unit 620 and a receiving unit 630, where the processing unit 620 is configured to:

if the sending unit 610 does not send slot format information, prohibit detection of at least a part of the first uplink signal on at least a part of the first time domain resource;

if the sending unit 610 sends slot format information and the slot format information indicates that a transmission direction of the first time domain resource is a non-uplink transmission direction, prohibit detection of at least a part of the first uplink signal on at least a part of the first time domain resource; or if the sending unit 610 sends slot format information and the slot format information indicates that a transmission direction of the first time domain resource is an uplink transmission direction, control the receiving unit 630 to receive the first uplink signal on the first time domain resource.

The slot format information is used to indicate the transmission direction of the first time domain resource, and the transmission direction is an uplink transmission direction or a non-uplink transmission direction.

That the first time domain resource at least partially overlaps the second time domain resource includes at least one of the following:

the first time domain resource belongs to the second time domain resource, in other words, the second time domain resource includes the first time domain resource;

the first time domain resource partially overlaps the second time domain resource;

the second time domain resource belongs to the first time domain resource, in other words, the first time domain resource includes the second time domain resource; and the first time domain resource completely overlaps the second time domain resource.

Optionally, the processing unit 620 is specifically configured to:

if the sending unit 610 does not send the slot format information on a time domain resource earlier than a time domain resource carrying the first resource indication information and the slot format information indicates that a transmission direction of the first time domain resource is an uplink transmission direction, control the receiving unit 630 to receive the first uplink signal on the first time domain resource.

Optionally, the first uplink signal is any one of the following:

a signal carried on a grant-free uplink data channel;

a signal carried on a semi-persistent scheduling uplink data channel;

a periodic sounding reference signal SRS;

periodic channel state information CSI; and a periodic random access signal.

Optionally, the first resource indication information is first uplink grant information.

The information transmission apparatus 600 may correspond to the network device described in the method 200 (for example, may be configured as the network device or may be the network device), and modules or units in the information transmission apparatus 600 are separately configured to perform actions or processing processes performed by the network device in the method 200. To avoid repetition, details are not described herein again.

In this embodiment of this application, the apparatus 600 may be a network device. The network device may include a processor, a transmitter, and a receiver. The processor, the transmitter, and the receiver are communicatively connected. Optionally, the network device further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the sending unit 610 shown in FIG. 9 may correspond to the transmitter of the network device, the processing unit 620 shown in FIG. 9 may correspond to the processor of the network device, and the receiving unit 630 shown in FIG. 9 may correspond to the receiver of the network device. In another implementation, the transmitter and the receiver may be implemented by a same component, to be specific, a transceiver.

In this embodiment of this application, the apparatus 600 may be a chip (or a chip system) installed in a network device. In this case, the apparatus 600 may include a processor and an input/output interface. The processor may be communicatively connected to a transceiver of the network device through the input/output interface. Optionally, the apparatus further includes a memory, and the memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

In this case, the sending unit 610 in the apparatus 60o shown in FIG. 9 may correspond to the output interface, the processing unit 620 shown in FIG. 9 may correspond to the processor, and the receiving unit 630 in the apparatus 60o shown in FIG. 9 may correspond to the input interface.

Figure 10:
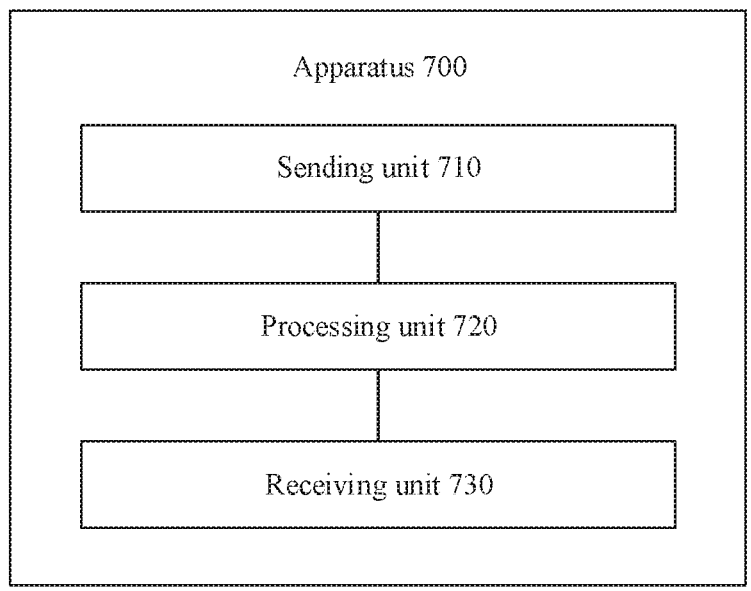

FIG. 10 is a schematic block diagram of a data transmission apparatus 700 according to an embodiment of this application. As shown in FIG. 10, the apparatus 700 includes:

a sending unit 710, configured to send first resource indication information, where the first resource indication information is used to indicate a first time domain resource, the first time domain resource at least partially overlaps a second time domain resource, and the second time domain resource is used to carry a first uplink signal; and a processing unit 720 and a receiving unit 730, where the processing unit 720 is configured to:

if the sending unit 710 does not send slot format information, control the receiving unit 730 to receive the first uplink signal on the first time domain resource;

if the sending unit 710 sends slot format information and the slot format information indicates that a transmission direction of the first time domain resource is an uplink transmission direction, control the receiving unit 730 to receive the first uplink signal on the first time domain resource; or if the sending unit 710 sends slot format information and the slot format information indicates that a transmission direction of the first time domain resource is a non-uplink transmission direction, prohibit detection of at least a part of the first uplink signal on at least a part of the first time domain resource.

The slot format information is used to indicate the transmission direction of the first time domain resource, and the transmission direction is an uplink transmission direction or a non-uplink transmission direction.

That the first time domain resource at least partially overlaps the second time domain resource includes at least one of the following:

the first time domain resource belongs to the second time domain resource, in other words, the second time domain resource includes the first time domain resource;

the first time domain resource partially overlaps the second time domain resource;

the second time domain resource belongs to the first time domain resource, in other words, the first time domain resource includes the second time domain resource; and the first time domain resource completely overlaps the second time domain resource.

Optionally, the processing unit 720 is specifically configured to:

if the sending unit 710 does not send the slot format information on a time domain resource earlier than a time domain resource carrying the first candidate time domain resource and the slot format information indicates that a transmission direction of the first time domain resource is an uplink transmission direction, control the receiving unit 730 to receive the first uplink signal on the first time domain resource.

Optionally, the first uplink signal is any one of the following:

a signal carried on a grant-free uplink data channel;

a signal carried on a semi-persistent scheduling uplink data channel;

a periodic sounding reference signal (SRS);

periodic channel state information (CSI); and a periodic random access signal.

Optionally, the first resource indication information is first uplink grant information.

The information transmission apparatus 700 may correspond to the network device described in the method 200 (for example, may be configured as the network device or may be the network device), and modules or units in the information transmission apparatus 700 are separately configured to perform actions or processing processes performed by the network device in the method 200. To avoid repetition, details are not described herein again.

In this embodiment of this application, the apparatus 700 may be a network device. The network device may include a processor, a transmitter, and a receiver. The processor, the transmitter, and the receiver are communicatively connected. Optionally, the network device further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the sending unit 710 shown in FIG. 10 may correspond to the transmitter of the network device, the processing unit 720 shown in FIG. 10 may correspond to the processor of the network device, and the receiving unit 730 shown in FIG. 10 may correspond to the receiver of the network device. In another implementation, the transmitter and the receiver may be implemented by a same component, to be specific, a transceiver.

In this embodiment of this application, the apparatus 700 may be a chip (or a chip system) installed in a network device. In this case, the apparatus 700 may include a processor and an input/output interface. The processor may be communicatively connected to a transceiver of the network device through the input/output interface. Optionally, the apparatus further includes a memory, and the memory is communicatively connected to the processor. Optionally, the processor, the memory, and the transceiver may be communicatively connected. The memory may be configured to store an instruction. The processor is configured to execute the instruction stored in the memory, to control the transceiver to send information or a signal.

In this case, the sending unit 710 in the apparatus 700 shown in FIG. 10 may correspond to the output interface, the processing unit 720 shown in FIG. 10 may correspond to the processor, and the receiving unit 730 in the apparatus 700 shown in FIG. 10 may correspond to the input interface.

A person of ordinary skill in the art may be aware that, the examples of units and algorithm steps described in combination with the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that such an implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
   receiving, by a terminal device, first resource indication information, wherein the first resource indication information indicates a first time domain resource, the first time domain resource at least partially overlaps a second time domain resource, the second time domain resource is allocated for transmission of a first uplink signal, and the first resource indication information indicates that the second time domain resource is to be occupied at least partially by a second uplink signal;
   detecting, by the terminal device, first indication information, wherein the first indication information indicates a transmission attribute of the first time domain resource, and the first indication information comprises slot format information;
   in response to the slot format information being detected successfully and the slot format information indicating that a transmission direction of the first time domain resource is a non-uplink transmission direction, prohibiting, by the terminal device, sending of at least a part of the first uplink signal on the second time domain resource; and
   in response to the slot format information being detected successfully and the slot format information indicating that the transmission direction of the first time domain resource is an uplink transmission direction, sending, by the terminal device, the first uplink signal on the second time domain resource.

2. The method according to claim 1, wherein the first resource indication information is preemption indication (PI).

3. The method according to claim 1, wherein the first resource indication information is first uplink grant information.

4. The method according to claim 1, further comprising:
in response to failing to detect the slot format information, sending, by the terminal device, the first uplink signal on the second time domain resource.

5. The method according to claim 1, further comprising:
in response to failing to detect the slot format information, prohibiting, by the terminal device, sending of at least a part of the first uplink signal on the second time domain resource.

6. The method according to claim 1, wherein the first uplink signal is periodic channel state information (CSI).

7. The method according to claim 1, wherein the first uplink signal is a periodic random access signal.

8. A communications apparatus, comprising:
a processor, and a memory, wherein the memory is configured to store a computer program, and the processor is configured to execute the computer program stored in the memory, to cause the communications apparatus to perform following:
receiving first resource indication information, wherein the first resource indication information indicates a first time domain resource, the first time domain resource at least partially overlaps a second time domain resource, the second time domain resource is allocated for transmission of a first uplink signal, and the first resource indication information indicates that the second time domain resource is to be occupied at least part partially by a second uplink signal;
detecting first indication information, wherein the first indication information indicates a transmission attribute of the first time domain resource, and the first indication information comprises slot format information;
in response to the slot format information being detected successfully and the slot format information indicating that a transmission direction of the first time domain resource is a non-uplink transmission direction, prohibiting sending of at least a part of the first uplink signal on the second time domain resource; and
in response to the slot format information being detected successfully and the slot format information indicating that the transmission direction of the first time domain resource is an uplink transmission direction, sending the first uplink signal on the second time domain resource.

9. The communications apparatus according to claim 8, wherein the first resource indication information is preemption indication (PI).

10. The communications apparatus according to claim 8, wherein the first resource indication information is first uplink grant information.

11. The communications apparatus according to claim 8, wherein
in response to failing to detect the slot format information, the computer program in the memory further causes the communications apparatus to send the first uplink signal on the second time domain resource.

12. The communications apparatus according to claim 8, wherein
in response to failing to detect the slot format information, the computer program in the memory further causes the communications apparatus to prohibit sending of at least a part of the first uplink signal on the second time domain resource.

13. The communications apparatus according to claim 8, wherein the first uplink signal is periodic channel state information (CSI).

14. The communications apparatus according to claim 8, wherein the first uplink signal is a periodic random access signal.

15. A communications apparatus, comprising:
a processor, and a memory, wherein the memory is configured to store a computer program, and the processor is configured to execute the computer program stored in the memory, to cause the communications apparatus to perform following:
sending first resource indication information, wherein the first resource indication information indicates a first time domain resource, the first time domain resource at least partially overlaps a second time domain resource, the second time domain resource is allocated for transmission of a first uplink signal of a terminal device, and the first resource indication information indicates that the second time domain resource is to be occupied at least partially by a second uplink signal; and
in response to first slot format information being sent to the terminal device and the first slot format information indicating that a transmission direction of the first time domain resource is a non-uplink transmission direction, prohibiting detection of at least a part of the first uplink signal on at least a part of the first time domain resource; and
in response to second slot format information being sent to the terminal device and the second slot format information indicating that the transmission direction of the first time domain resource is an uplink transmission direction, receiving the first uplink signal on at least a part of the first time domain resource from the terminal device.

16. The communications apparatus according to claim 15, wherein the first uplink signal is periodic channel state information (CSI).

17. The communications apparatus according to claim 15, wherein the first uplink signal is a periodic random access signal.

18. The communications apparatus according to claim 15, wherein the first resource indication information is preemption indication (PI).

19. The communications apparatus according to claim 15, wherein the first resource indication information is first uplink grant information.

20. The communications apparatus according to claim 15, wherein
in response to no slot format information being sent to the terminal device, the computer program in the memory further causes the communications apparatus to receive the first uplink signal from the terminal device on the second time domain resource.

* * * * *